United States Patent
Turgeon et al.

(10) Patent No.: US 10,142,021 B2
(45) Date of Patent: Nov. 27, 2018

(54) SATELLITE SYSTEM USING OPTICAL GATEWAYS AND GROUND BASED BEAMFORMING

(71) Applicant: Space Systems/Loral, LLC, Palo Alto, CA (US)

(72) Inventors: Ghislain Turgeon, San Jose, CA (US); Vijaya Gallagher, Palo Alto, CA (US); Leah Wang, Fremont, CA (US)

(73) Assignee: SPACE SYSTEMS/LORAL, LLC, Palo Alto, CA (US)

( * ) Notice: Subject to any disclaimer, the term of this patent is extended or adjusted under 35 U.S.C. 154(b) by 0 days.

(21) Appl. No.: 15/682,785

(22) Filed: Aug. 22, 2017

(65) Prior Publication Data

US 2018/0069629 A1   Mar. 8, 2018

Related U.S. Application Data

(60) Provisional application No. 62/384,604, filed on Sep. 7, 2016.

(51) Int. Cl.
  *H04B 10/118* (2013.01)
  *H01Q 1/28* (2006.01)
  (Continued)

(52) U.S. Cl.
  CPC ........... *H04B 10/118* (2013.01); *H01Q 1/288* (2013.01); *H04B 10/112* (2013.01);
  (Continued)

(58) Field of Classification Search
  CPC ...... H04B 7/2041; H04B 1/1027; H04B 7/10; H04B 17/12; H04B 7/0617; H04B 10/118;
  (Continued)

(56) References Cited

U.S. PATENT DOCUMENTS 5,966,371 A   10/1999  Sherman
6,016,124 A   1/2000   Lo et al.
(Continued)

FOREIGN PATENT DOCUMENTS

WO   WO2014189570 A2   11/2014

OTHER PUBLICATIONS

Prabu K, et al., "Analysis of Optical Modulators for Radio Over Free Space Optical Communication Systems and Radio Over Fiber Systems", Annual IEEE India Conference, INDICON 2012, Dec. 2012, 1176-1179, 10.1109/INDCON.2012.6420795.
(Continued)

*Primary Examiner* — Don N Vo
(74) *Attorney, Agent, or Firm* — Vierra Magen Marcus LLP

(57) ABSTRACT

Described herein are ground based subsystems, and related methods, for use in transmitting an optical feeder uplink beam to a satellite that includes a multiple element antenna feed array and that is configured to accept the optical feeder uplink beam and in dependence thereon use the multiple element antenna feed array to produce and transmit a plurality of radio frequency (RF) service downlink beams to service terminals. Certain embodiments are related to a ground based beamformer (GBBF) for inclusion in a ground based subsystem, and methods for use therewith. Beneficially, embodiments described herein allow for flexible antenna beam forming for large signal bandwidth without the limitation associated with the available gateway uplink and downlink spectrum at RF frequencies. Also described herein are space based subsystems for use with such ground based subsystems.

23 Claims, 10 Drawing Sheets

(51) Int. Cl.
    *H04B 10/112* (2013.01)
    *H04B 10/25* (2013.01)
    *H04B 10/272* (2013.01)
    *H04B 10/00* (2013.01)
    *H04B 10/80* (2013.01)

(52) U.S. Cl.
    CPC ......... *H04B 10/1121* (2013.01); *H04B 10/25* (2013.01); *H04B 10/272* (2013.01); *H04B 10/30* (2013.01); *H04B 10/80* (2013.01)

(58) Field of Classification Search
    CPC ...... H04B 10/80; H04B 10/30; H04B 10/272; H04B 10/1121; H04B 10/25; H04W 16/28; H04W 88/08; H01Q 1/288; H04L 1/0091; H04Q 1/288
    USPC .......................................... 398/122
    See application file for complete search history.

(56) References Cited

U.S. PATENT DOCUMENTS

| | | |
|---|---|---|
| 6,246,498 B1 | 6/2001 | Dishman et al. |
| 6,914,557 B2 | 7/2005 | Chang et al. |
| 7,787,819 B2 | 8/2010 | Walker et al. |
| 8,135,338 B1 | 3/2012 | Gelon et al. |
| 8,918,055 B2 | 12/2014 | Ramachandran et al. |
| 2005/0100339 A1 | 5/2005 | Tegge, Jr. |
| 2005/0117914 A1 | 6/2005 | Chuah et al. |
| 2007/0281612 A1 | 12/2007 | Benjamin et al. |
| 2008/0051080 A1* | 2/2008 | Walker ................ H04B 7/2041 455/427 |
| 2009/0202254 A1 | 8/2009 | Majumdar et al. |
| 2012/0328298 A1 | 12/2012 | Yi et al. |
| 2017/0093539 A1* | 3/2017 | Wang .................... H04B 17/12 |
| 2017/0214462 A1 | 7/2017 | Busche et al. |
| 2017/0288769 A1* | 10/2017 | Miller .................... H04B 7/212 |
| 2017/0366262 A1 | 12/2017 | Turgeon et al. |
| 2017/0366263 A1 | 12/2017 | Turgeon et al. |
| 2018/0054251 A1* | 2/2018 | Alex ................ H04B 7/18506 |
| 2018/0083678 A1* | 3/2018 | Alexander ........... H04B 7/0617 |

OTHER PUBLICATIONS

Kazaura et al., "RoFSO: A Universal Platform for Convergence of Fiber and Free-Space Optical Communication Networks", IEEE Communications Magazine, IEEE Service Center, Piscataway, US, vol. 48, No. 2, Feb. 2010, pp. 130-137.

Search Report dated Jan. 2, 2018, in European Application No. 17189303.5.

Office Action dated Dec. 14, 2017, in U.S. Appl. No. 15/394,512, filed Dec. 29, 2016.

Amendment dated Jan. 5, 2018, in U.S. Appl. No. 15/394,512, filed Dec. 29, 2016.

Walker, et al., "Architecture, Implementation and Performance of Ground-Based Beam Forming in the DBSD G1 Mobile Satellite System", 28th AIAA International Communications Satellite Systems Conference (ICSSC-2010), Aug. 30, 2010-Sep. 2, 2010, Published by the American Institute of Aeronautics and Astronautics, Inc., pp. 1-29.

Allam, "Types of Beamforming", Adaptive Antennas, Lectures, Feb. 27, 2017, pp. 1-33.

Notice of Allowance dated May 16, 2018, in U.S. Appl. No. 15/394,512, filed Dec. 29, 2016.

Amendment dated Sep. 13, 2018, in European Patent Appl. No. 17189303.5.

\* cited by examiner

SATELLITE SYSTEM USING OPTICAL GATEWAYS AND GROUND BASED BEAMFORMING

PRIORITY CLAIM

This application claims priority to U.S. Provisional Patent Application No. 62/384,604, filed Sep. 7, 2016, which is incorporated herein by reference in its entirety.

BACKGROUND

There is increasing need for large amounts of bandwidth to be routed between a ground based gateway and a spaced based satellite. With the recent announcement of planned Ka band and Ku band satellite constellations, it would be beneficial if such frequency band satellite constellations can be used to help satisfy the aforementioned increasing need for large amounts of bandwidth to be routed between a ground based gateway and a spaced based satellite.

DETAILED DESCRIPTION

Certain embodiments of the present technology described herein relate to system and sub-system architectures for high throughput satellites (HTS), very high throughput satellites (VHTS) and very very high throughput satellites (VVHTS), which is also known as ultra high throughput satellites (UHTS), all of which can be collectively referred to as HTS. Embodiments of the present technology can also be used to implement mobile satellite services (MSS) and direct-to-home (DTH) satellite services. Because of spectrum availability, if feeder links between gateway (GW) sites and satellites are at optical frequencies, then the number of GW sites can be drastically reduced compared to if the feeder links are at RF frequencies, which leads to significant cost savings in the space and ground segments. Even with the availability of 5 GHz spectrum at V band and dual polarization, a satellite with Terabit/sec (Tb/s) capacity would need between 40 and 70 GWs using RF feeder links, depending on the spectral efficiency achieved, as described in a conference paper titled "Optical Feederlinks for VHTS—System Perspectives", by Mata-Calvo et al. (Conference: Proceedings of the Ka and Broadband Communications, Navigation and Earth Observation Conference 2015. Ka Conference 2015, 12-14 Oct. 2015, Bologna, Italy). In contrast, using optical feeder links can reduce the total active GW count to one (plus a few sites would be added for diversity and redundancy; but note that V/Q band or Ka band GWs typically also need diversity and redundancy sites to achieve high availability).

Prior to describing details of specific embodiments of the present technology, it is first useful to describe an exemplary wireless communication system with which embodiments of the present technology would be useful. An example of such a wireless communication system will now be described with reference to FIG. 1.

Figure 1:
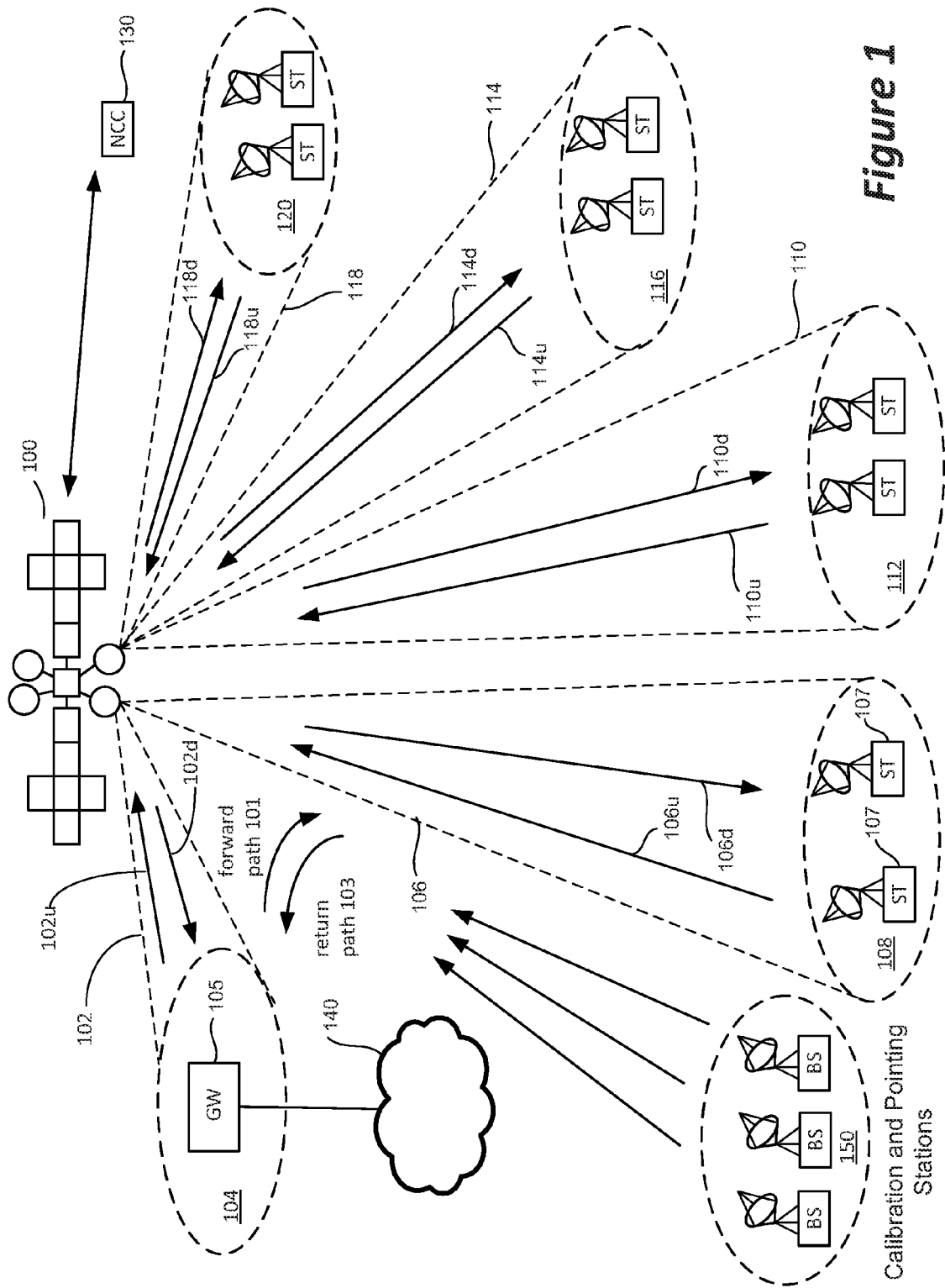
FIG. 1 is a block diagram describing a wireless communication system, which may be a satellite communication system.

FIG. 1 depicts a block diagram of a wireless communications system that includes a communication platform 100, which may be a satellite located, for example, at a geostationary or non-geostationary orbital location. In other embodiments, other platforms may be used such as an unmanned aerial vehicle (UAV) or balloon, or even a ship for submerged subscribers. In yet another embodiment, the subscribers may be air vehicles and the platform may be a ship or a truck where the "uplink" and "downlink" in the following paragraphs are reversed in geometric relations. Platform 100 may be communicatively coupled to at least one gateway (GW) 105 and a plurality of subscriber terminals ST (including subscriber terminals 107). The term subscriber terminals may be used to refer to a single subscriber terminal or multiple subscriber terminals. A subscriber terminal ST is adapted for communication with the wireless communication platform 100, which as noted above, may be a satellite. Subscriber terminals may include fixed and mobile subscriber terminals including, but not limited to, a cellular telephone, a wireless handset, a wireless modem, a data transceiver, a paging or position determination receiver, or mobile radio-telephone, or a headend of an isolated local network. A subscriber terminal may be handheld, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, or a mobile. Where the communication platform of a wireless communication system is a satellite, the wireless communication system can be referred to more specifically as a satellite communication system. For the remainder of this description, unless stated otherwise, it is assumed that the communication platform 100 is a satellite. Accordingly, platform 100 will often be referred to as satellite 100, and the wireless communication system will often be referred to as a satellite communication system.

In one embodiment, satellite 100 comprises a bus (e.g., spacecraft) and one or more payloads (e.g., the communication payload). The satellite will also include multiple power sources, such as batteries, solar panels, and one or more propulsion systems, for operating the bus and the payload.

The at least one gateway 105 may be coupled to a network 140 such as, for example, the Internet, terrestrial public switched telephone network, mobile telephone network, or a private server network, etc. Gateway 105 and the satellite (or platform) 100 communicate over a feeder beam 102, which has both a feeder uplink 102u and a feeder downlink 102d. In certain embodiments, a feeder downlink beam 102d is a spot beam to illuminate a region 104 on the Earth's surface (or another surface). Gateway 105 is located in region 104 and communicates with satellite 100 via feeder beam 102. Although a single gateway is shown, some implementations will include many gateways, such as five, ten, or more. One embodiment includes only one gateway. Each gateway may utilize its own feeder beam, although more than one gateway can be positioned within a feeder beam. In one embodiment, a gateway is located in the same spot beam as one or more subscriber terminals.

Subscriber terminals ST and satellite 100 communicate over service beams, which are also known as user beams. For example, FIG. 1 shows service beams 106, 110, 114 and 118 for illuminating regions 108, 112, 116 and 120, respectively. In many embodiments, the communication system will include more than four service beams (e.g., sixty, one hundred, etc.). Each of the service beams have an uplink (106u, 110u, 114u, 118u) and a downlink (106d, 110d, 114d, 118d) for communication between subscriber terminals ST and satellite 100. Although FIG. 1 only shows two subscriber terminals within each region 108, 112, 116 and 120, a typical system may have thousands of subscriber terminals within each region.

In one embodiment, communication within the system of FIG. 1 follows a nominal roundtrip direction whereby data is received by gateway 105 from network 140 (e.g., the Internet) and transmitted over the forward path 101 to a set of subscriber terminals ST. In one example, communication over the forward path 101 comprises transmitting the data from gateway 105 to satellite 100 via uplink 102u of feeder beam 102, through a first signal path on satellite 100, and from satellite 100 to one or more subscriber terminals ST via downlink 106d of service beam 106. An uplink (e.g., 102u) of a feeder beam (e.g., 102) can also be referred to more succinctly as a feeder uplink beam, and the downlink (e.g., 106d) of a service beam (e.g., a 106) can also be referred to more succinctly as a service downlink beam. Although the above example mentions service beam 106, the example could have used other service beams.

Data can also be sent from the subscriber terminals STs over the return path 103 to gateway 105. In one example, communication over the return path comprises transmitting the data from a subscriber terminal (e.g., subscriber terminal 107 in service beam 106) to satellite 100 via uplink 106u of service beam 106, through a second signal path on satellite 100, and from satellite 100 to gateway 105 via downlink 102d of feeder beam 102. An uplink (e.g., 106u) of a service beam (e.g., 106) can also be referred to more succinctly as a service uplink beam, and the downlink 102d of feeder beam 102 can also be referred to more succinctly as a feeder downlink beam. Although the above example uses service beam 106, the example could have used any service beam.

FIG. 1 also shows a Network Control Center (NCC) 130, which can include an antenna and modem for communicating with satellite 100, as well as one or more processors and data storage units. Network Control Center 130 provides commands to control and operate satellite 100. Network Control Center 130 may also provide commands to any of the gateways and/or subscriber terminals.

FIG. 1 also shows calibration and pointing stations 150 that are used to determine amplitude and phase errors associated with forward path and return path signals 101 and 103, which amplitude and phase errors can be used by a ground based beam former (GBBF) (e.g., 230 in FIGS. 2A and 2B) to perform ground based beamforming, in accordance with certain embodiments of the present technology. More specifically, the amplitude and phase errors can be used as, or used to determine, amplitude and phase coefficients that are used by the GBBF 230 to perform ground based beamforming. In accordance with certain embodiments, the calibration and pointing stations 150 are part of a calibration subsystem. Such a calibration subsystem can also include one or more processors and data storage units. The calibration subsystem can control the transmission and reception of calibration signals, and can control the execution of algorithms and/or the like that are used to determine amplitude and phase errors and/or coefficients. The calibration subsystem may also be used for forward uplink power control and to correct for Doppler effects, but is not limited thereto.

In one embodiment, communication platform 100 implements the technology described below. In other embodiments, the technology described below is implemented on a different platform (or different type of satellite) in a different communication system. For examples, the communication platform can alternatively be a UAV or balloon, but is not limited thereto.

The architecture of FIG. 1 is provided by way of example and not limitation. Embodiments of the disclosed technology may be practiced using numerous alternative implementations.

Conventionally, a gateway (e.g., gateway 105) communicates with a satellite (e.g., satellite 100) using an antenna on the ground that transmits and receives RF (radiofrequency) signals to and from an antenna on the satellite. Certain embodiments of the present technology utilize optical components (instead of antennas) to transmit and receive optical signals (instead of RF signals) between a gateway and a satellite, as will be described in additional details below.

Certain embodiments of the present technology involve the use of analog-over free-space optical signals, which leads to an elegant architecture for a satellite repeater, whereby all frequency down-conversion in the forward link is eliminated. An advantage of this approach, especially for HTS satellites, is that it eliminates the need for very high speed Analog-to-Digital Converters (ADCs) and Digital to Analog Converters (DACs) on the satellites. Further, this approach allows the aggregation of multiple user links but does not require extra hardware associated with an onboard demodulator and remodulator, and thus reduces the mass, power and cost of the satellite, perhaps making the difference between being able to launch or not being able to launch the satellite. In addition, in accordance with specific embodiments where the uplink and downlink communication signals are modulated at transmit (forward) and receive (return) RF frequencies, no frequency conversion in the forward link is required on the satellite, thereby further simplifying the payload design. By contrast, previously envisioned free-space optical spacecraft architectures proposed demodulation of the optical signal, followed by routing to user link pathways and remodulation of the signal on user link RF frequencies. Further, certain embodiments of the present technology eliminate the need for a satellite to include an onboard channelizer, as will be described in additional detail below.

Block diagrams for the communications subsystems for the ground and space segments, according to certain embodiments of the present technology, are described below with reference to FIGS. 2A, 2B, 3, 4A, 4B, 5A and 5B. Certain embodiments use analog modulation and demodulation on the satellite, thus enabling optical feeder links without onboard processing.

Figure 2A:
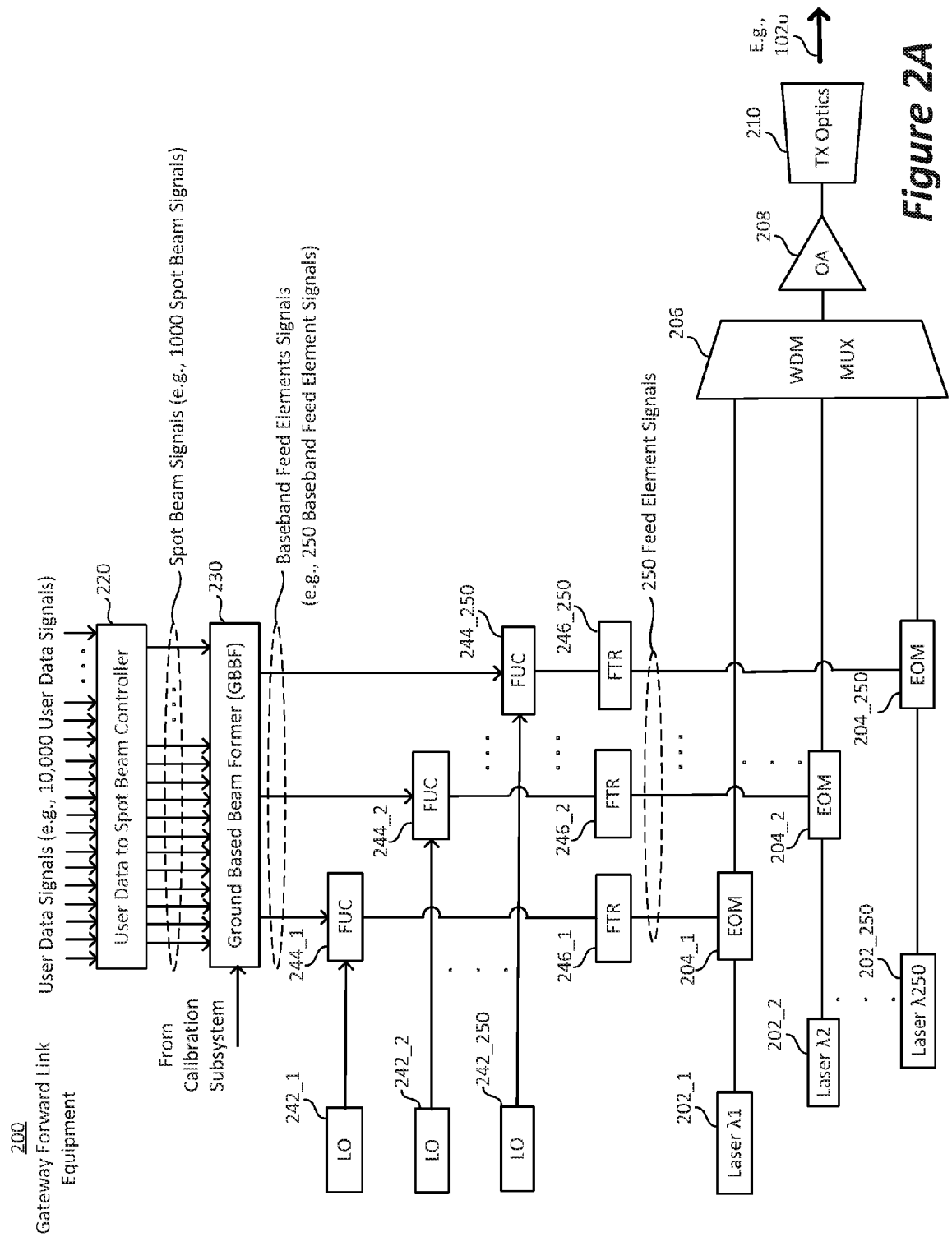
FIG. 2A depicts gateway forward link equipment, according to an embodiment of the present technology.
Figure 2B:
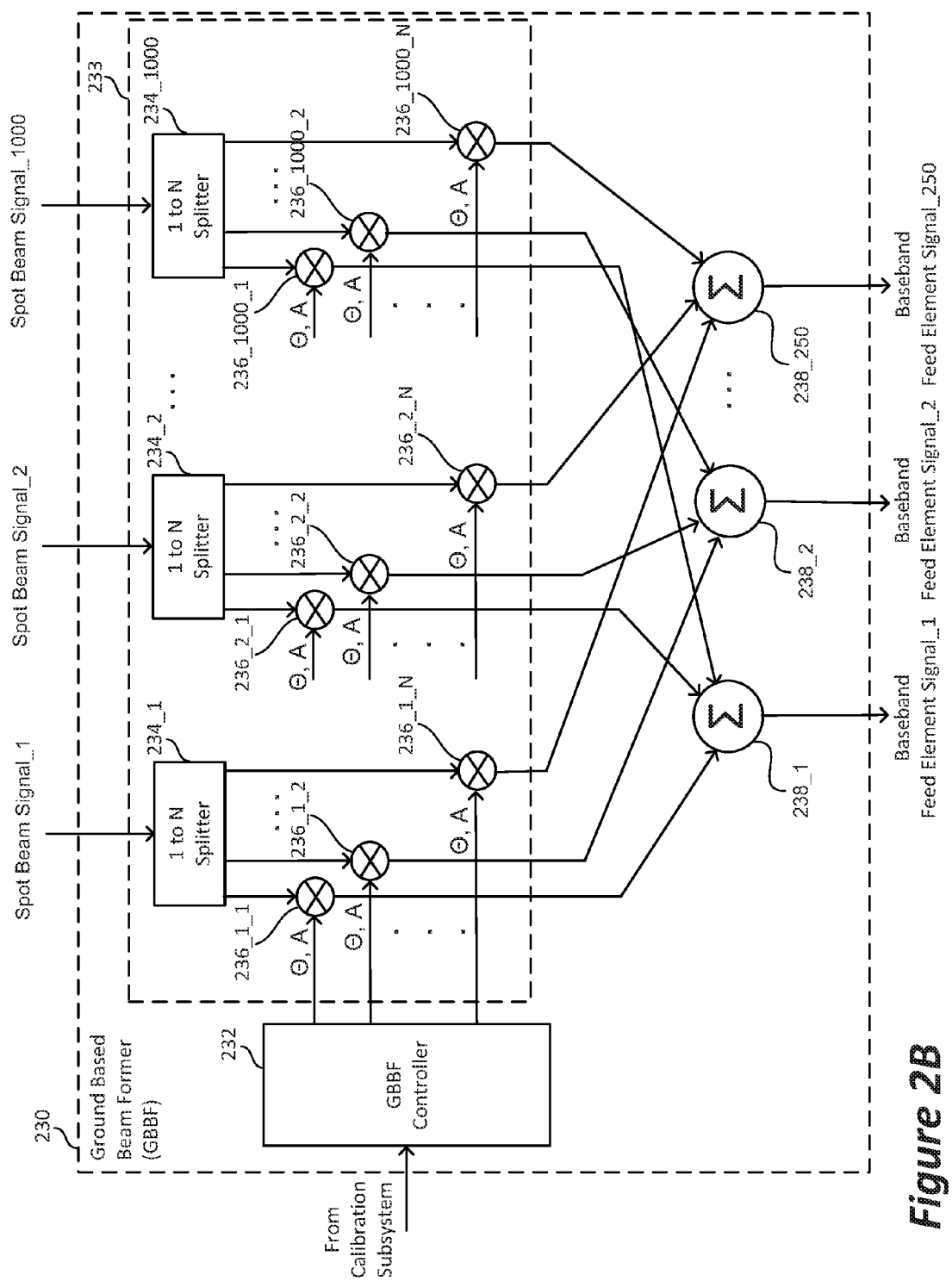
FIG. 2B depicts components of the ground based beamformer (GBBF) introduced in FIG. 2A, according to an embodiment of the present technology.
Figure 3:
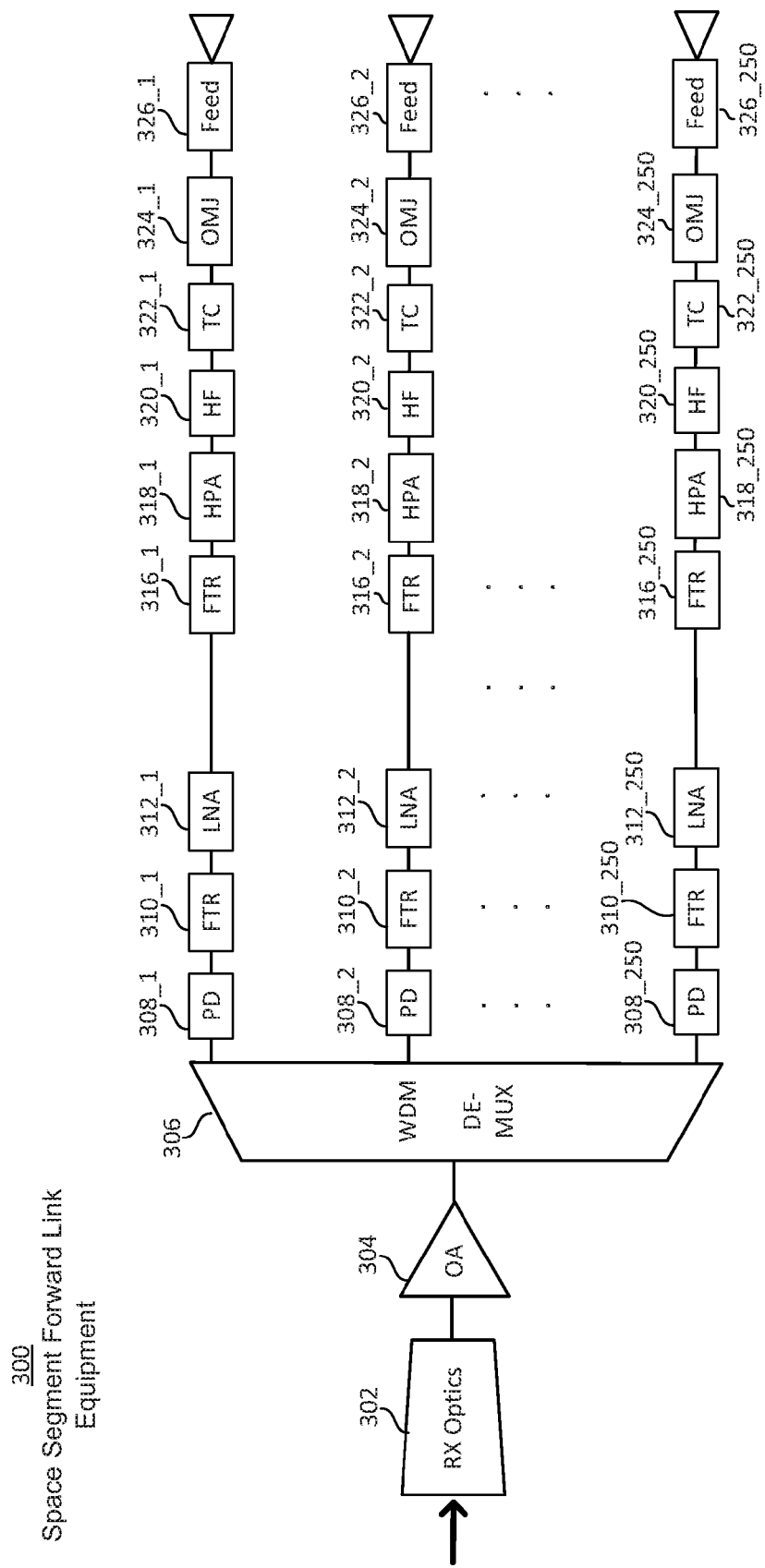
FIG. 3 depicts space segment forward link equipment, according to an embodiment of the present technology.

FIGS. 2A and 2B will first be used to describe gateway forward link equipment according to certain embodiments of the present technology. FIG. 3 will then be used to describe space segment forward link equipment according to an embodiment of the present technology. In specific embodiments, two hundred and fifty laser wavelengths are combined at a single gateway (which can be referred to as an optical gateway) and sent to the satellite, which has multiple (e.g., two hundred and fifty) user beams (also known as service beams) operating at Ka band frequencies. In accordance with an embodiment, each wavelength carries 2.5 GHz so that a total of 625 GHz is sent from the gateway on the ground to the satellite. At a modest spectral efficiency of 2 bps/Hz, this leads to a 1.25 Tb/s satellite design. In accordance with another embodiment, each wavelength carries 2.9 GHz so that a total of 725 GHz is sent from the gateway on the ground to the satellite. At a modest spectral efficiency of 2 bps/Hz, this leads to a 1.45 Tb/s satellite design. FIGS. 4A and 4B and FIGS. 5A and 5B will thereafter be used to depict return link equipment for a satellite and a gateway.

Gateway Forward Link Equipment

FIG. 2A will now be used to describe gateway forward link equipment 200, according to an embodiment of the present technology. Such gateway forward link equipment 200 can also be referred to as an optical gateway forward link subsystem 200, or more generally, as an optical communication subsystem. Referring to FIG. 2A, the optical gateway forward link subsystem 200 is shown as including two hundred and fifty lasers 202_1 to 202_250, two hundred and fifty electro-optical modulator (EOMs) 204_1 to 204_250, a wavelength-division multiplexing (WDM) multiplexer (MUX) 206, an optical amplifier (OA) 208, and transmitter optics 210. The optical gateway forward link subsystem 200 is also shown as including a user data to spot beam controller 220 and a ground based beam former (GBBF) 230. The optical gateway forward link subsystem 200 is also shown as including two hundred and fifty local oscillators (LOs) 242_1 to 242_250, two hundred and fifty frequency up converters (FUCs) 244_1 to 244_250, and two hundred and fifty filters (FTRs) 246_1 to 246_250. Each of these elements is described below.

The user data to spot beam controller 220 is shown as receiving user data signals, e.g., 10,000 user data signals. An individual user data signal can be for forwarding to an individual service terminal ST, or multiple user data signals can be for simultaneously forwarding to an individual service terminal ST. In a broadcast scheme, an individual user data signal can be for forwarding to multiple service terminals ST simultaneously. Additional and/or alternative variations are also possible. These user data signals, as will be described below, are included within an optical feeder uplink beam (e.g., 102u) that is transmitted by the gateway forward link equipment 200 to a satellite (e.g., 100), and the satellite includes the user data signals within spot beams (e.g., the RF service downlink beams 106d, 110d, 114d and 118d in FIG. 1) that are transmitted to service terminals ST. Assume, for example, that the satellite (e.g., 100 in FIG. 1) is configured to transmit one thousand spot beams using two hundred and fifty feed elements (e.g., feed elements 326_1 to 326_250 in FIG. 3), and that the user data to spot beam controller 220 receives ten thousand user data signals. Continuing with this example, the user data to spot beam controller 220 would map the ten thousand user data signals to one thousand spot beam signals, which are provided to the GBBF 230. The one thousand spot beam signals that are provided to the GBBF 230, will, after they are included within an optical feeder uplink beam (e.g., 102u) that is transmitted by the gateway forward link equipment 200 to a satellite (e.g., 100), be used by the satellite (e.g., 100) to transmit one thousand spot beams that each cover a limited geographic region on Earth. More generally, the user data to spot beam controller 220 is configured to map, to each of a plurality of spot beam signals (e.g., to each of one thousand spot beam signals), a subset (e.g., ~ten) of the plurality of user data signal signals (e.g., ten thousand user data signals). The user data to spot beam controller 220, in accordance with certain embodiments, is performed digitally.

The GBBF 230, as will be described in additional detail with reference to FIG. 2B, receives the one thousand spot beam signals, and uses calibration information received from a calibration subsystem, to produce two hundred and fifty baseband feed element signals. The two hundred and fifty baseband feed element signals are provided to respective frequency up-converters (FUCs) 244_1 to 244_250, each of which also receives an RF carrier signal from a respective one of the local oscillators (LOs) 242_1 to 242_250. In other words, the local oscillators (LOs) 242_1 to 242_250, which can be referred to collectively as LOs 242, or individually as an LO 242, provide RF carrier signals to the FUCs 244, so that the FUCs 244 can frequency up-convert the feed element signals to a desired frequency range. In accordance with certain embodiments, in order to eliminate a need for RF frequency down-converters in the forward link equipment (e.g., 300 in FIG. 3) onboard the satellite, the carrier frequencies of the RF signals are used to up convert the feed element signals to the desired user downlink frequency band within the Ka band (or some other allotted band). As a result, the satellite repeater is greatly simplified. Still referring to FIG. 2A, the two hundred and fifty frequency up-converted feed elements signals (which can also be referred to more succinctly as feed element signals) are shown as being filtered by responsive FTRs 246_1 to 246_2, to filter out unwanted frequency components (e.g., unwanted mixed products) that result from the frequency up-conversions.

For an example, a portion of the Ka band that may be desirable to use for transmitting service downlink beams (also referred to as downlink user beams, or spot beams) from satellite 100 to service terminals ST can be from 17.7-20.2 GHz, and thus, includes a 2.5 GHz bandwidth. In such a case, each of the EOMs 204 could modulate the optical signal it receives (e.g., via an optical fiber from a respective laser 202) with a separate RF signal having a frequency within the range from 17.7-20.2 GHz. In other words, the FUCs 244 can be used to frequency up-convert baseband feed element signals to be within the frequency range from 17.7-20.2 GHz. Further, since each of the two hundred and fifty optical data signals (produced by the two hundred and fifty EOMs) has a bandwidth of 2.5 GHz, the bandwidth of the optical feeder uplink beam that is sent from the ground to the satellite is 625 GHz (i.e., 2.5 GHz*250=625 GHz). For another example, a portion of the Ka band that may be desirable to use for transmitting service downlink beams (also referred to as downlink user beams or spot beams) from satellite 100 to service terminals ST can be from 17.3-20.2 GHz, and thus, includes a 2.9 GHz bandwidth. In such a case, each of the EOMs 204 could modulate the optical signal it receives (e.g., via an optical fiber from a respective laser 202) with a separate RF signal having a frequency within the range from 17.3-20.2 GHz. In other words, the FUCs 244 can be used to frequency up-convert baseband feed element signals to be within the frequency range from 17.3-20.2 GHz. Further, since each of the two hundred and fifty optical data signals (produced by the two hundred and fifty EOMs) has a bandwidth of 2.9 GHz, the bandwidth of the optical feeder uplink beam that is sent from the ground to the satellite is 725 GHz (i.e., 2.9 GHz*250=725 GHz).

Still referring to FIG. 2A, each of the two hundred and fifty separate EOMs 204_1 to 204_250 is shown as receiving a respective one of the frequency up-converted feed element signals and a respective one of a plurality of optical carrier signals output by the two hundred and fifty lasers 202_1 to 201_250, which can be referred to individually as a laser 202, or collectively as the lasers 202. Explained another way, the light emitted by each of the two hundred and fifty lasers 202, which can be referred to as an optical carrier signal, is provided (e.g., via a respective optical fiber) to a respective one of the two hundred and fifty separate EOMs 204_1 to 204_250.

The two hundred and fifty separate lasers 202_1 to 202_250 each emit light of a different wavelength within a specified wavelength range that is for use in producing the optical feeder uplink beam (e.g., 102$u$). The lasers as noted above can be referred to individually as a laser 202, or collectively as the lasers 202. Where the specified wavelength range is, for example, from 1510 nanometers (nm) to 1560 nm, then the laser 202_1 may emit light having a peak wavelength of 1510 nm, the laser 202_2 may emit light having a peak wavelength of 1510.2 nm, the laser 202_3 (not shown) may emit light having a peak wavelength of 1510.4 nm, . . . the laser 202_249 (not shown) may emit light having a peak wavelength of 1559.8 nm, and the laser 202_250 may emit light having a peak wavelength of 1560 nm. In other words, the peak wavelengths emitted by the lasers 202 can occur at 0.2 nm intervals from 1510 nm to 1560 nm. The wavelength range from 1510 nm to 1560 nm, which is within the infrared (IR) spectrum, is practical to use because IR lasers for use in communications are readily available. However, wider or narrow wavelength ranges, within the same or other parts of the optical spectrum, may alternatively be used. For example, it would also be possible to utilize a wavelength range within the 400 nm-700 nm visible spectrum. It is also possible that the wavelength range that is specified for use in producing the optical feeder uplink beam (e.g., 102$u$) is non-contiguous. For example, the wavelength range that is for use in producing the optical feeder uplink beam can be from 1510 nm to 1534.8 nm and from 1540.2 nm to 1564.8 nm. Further, it is also possible that gateway forward link equipment can alternatively include more or less than two hundred and fifty lasers (that each emit light of a different peak wavelength within a specified contiguous or non-contiguous wavelength range). Additionally, it is noted that the gateway forward link equipment may include two or more of each of the lasers (that each emit light of a different peak wavelength within a specified contiguous or non-contiguous wavelength range) to provide for redundancy or backup. Each of the lasers 202 can be, for example, a diode-pumped infrared neodymium laser, although the use of other types of lasers are also within the scope of the embodiments described herein.

To reduce and preferably avoid interference, the wavelength range that is for use in producing the optical feeder uplink beam (e.g., 102$u$) should be different than the wavelength range that is for use in producing the optical feeder downlink beam (e.g., 102$d$). For example, if the wavelength range that is for use in producing the optical feeder uplink beam 102$u$ is from 1510 nm to 1560 nm, then the wavelength range that is for use in producing the optical feeder downlink beam 102$d$ can be from 1560.2 nm to 1575 nm. For another example, if the wavelength range that is for use in producing the optical feeder uplink beam 102$u$ is from 1510 nm to 1534.8 nm and from 1540.2 nm to 1564.8 nm, then the wavelength range that is for use in producing the optical feeder downlink beam 102$d$ can be from 1535 nm to 1540 nm and from 1565 nm to 1575 nm. These are just a few examples, which are not intended to be all encompassing. Details of how an optical feeder downlink beam (e.g., 102$d$) can be produced in accordance with an embodiment of the present technology are provided below in the discussion of FIGS. 4A and 4B.

Still referring to FIG. 2A, the light emitted by each of the two hundred and fifty lasers 202, which can be referred to as an optical carrier signal, is provided (e.g., via a respective optical fiber) to a respective one of the two hundred and fifty separate EOMs 204_1 to 204_250. Each of the EOMs is an optical device in which a signal-controlled element exhibiting an electro-optic effect is used to modulate a respective beam of light. The modulation performed by the EOMs 204 may be imposed on the phase, frequency, amplitude, or polarization of a beam of light, or any combination thereof. In accordance with a specific embodiment, each of the EOMs 204 is a phase modulating EOM that is used as an amplitude modulator by using a Mach-Zehnder interferometer. In other words, each of the EOMs 204 can be implemented as a Mach-Zehnder modulator (MZM), which can be a Lithium Niobate Mach-Zehnder modulator, but is not limited thereto. In accordance with specific embodiments, each of the EOMs 204 is implemented as an MZM that produces an amplitude modulated (AM) optical waveform with a modulation index between 10% and 80% in order to maintain fidelity of an RF waveform (modulated therein) without too much distortion. The optical signal that is output by each of the EOMs 204 can be referred to as an optical frequency up-converted feed element signal, or more succinctly as an optical feed element signal. The modulation scheme that is implemented by the EOMs 204 can result in double- or vestigial-sidebands, including both an upper sideband (USB) and a lower sideband (LSB). Alternatively single-sideband modulation (SSB) can be utilized to increase bandwidth and transmission power efficiency.

The two hundred and fifty separate optical feed element signals that are output by the two hundred and fifty EOMs 204 are provided to the WDM MUX 206, which can also be referred to as a dense wavelength division multiplexing (DWDM) MUX. The WMD MUX 206 multiplexes (i.e., combines) the two hundred and fifty optical feed element signals, received from the two hundred and fifty EOMs 204, onto a single optical fiber, with each of the two hundred and fifty separate optical feed element signals being carried at the same time on its own separate optical wavelength within the range from 1510 nm to 1560 nm (or some other contiguous or non-contiguous wavelength range). For example, as explained above, the two hundred and fifty separate optical feed element signals can have peak wavelengths of 1510 nm, 1510.2 nm, 1510.4 nm . . . 1559.8 nm and 1560 nm.

The signal that is output by the WMD MUX 206, which can be referred to as a wavelength division multiplexed optical signal, is provided to the optical amplifier (OA) 208. The OA 208 amplifies the wavelength division multiplexed optical signal so that the wavelength division multiplexed optical signal has sufficient power to enable transmission thereof from the ground to the satellite 100 in space. An exemplary type of OA 208 that can be used is an erbium-doped fiber amplifier (EDFA). However embodiments of the present technology are not limited to use with an EDFA. The output of the OA 208 can be referred to as an optically amplified wavelength division multiplexed optical signal.

The optically amplified wavelength division multiplexed optical signal, which is output by the OA 208, is provided (e.g., via an optical fiber) to the transmitter optics 210. The transmitter optics 210, which can also be referred to as a telescope, can includes optical elements such as lenses, mirrors, reflectors, filters and/or the like. The transmitter optics 210 outputs a collimated optical feeder uplink beam that is aimed at a satellite. A gimbal, and/or the like, can be used to control the steering of the transmitter optics 210. In accordance with an embodiment, the collimated optical feeder uplink beam has an aperture of about 100 cm, and a half beam divergence of about 0.0000004 radians, wherein the term "about" as used herein means+/−10 percent of a specified value. The use of other apertures and half beam divergence values are also within the scope of the embodiments described herein. The collimated optical feeder uplink beam, which is output by the transmitter optics 210, is transmitted in free-space to receiver optics on a satellite. The term "free-space" means air, outer space, vacuum, or something similar (which is in contrast to using solids such as optical fiber cable, an optical waveguide or an optical transmission line). Reception and processing of the optical feeder uplink beam received at the satellite will be described in additional detail below. However, before describing the reception and processing of the optical feeder uplink beam received at the satellite, additional details of the gateway forward link equipment, according to certain embodiments of the present technology, will first be provided.

In order to wavelength division multiplex two hundred and fifty wavelengths produced by the two hundred and fifty lasers 202_1 to 202_250, a combination of C band optical frequencies (from 1530 nm to 1565 nm) and L band optical frequencies (from 1565 nm to 1625 nm) may be used, in order to keep the separation of the wavelengths to be at least 20-25 GHz in order to reduce and preferably minimize inter-wavelength interference that may occur in an optical fiber due to non-linearities. If fewer wavelengths are used (e.g., at C band alone), and higher bandwidth is available at Ka band per user beam (e.g., if 2.9 GHz is available as it is in certain ITU Regions), the overall throughput still remains of the order of several hundred GHz, which lets the capacity reach the Tb/s range. If instead each wavelength carries more than the Ka band user bandwidth, fewer wavelengths can be used, but some amount of frequency conversion may be needed in the space segment forward link equipment.

A technology that is increasingly being deployed for use with satellite communication is ground based beamforming, where a feederlink is segmented into smaller frequency bands and routed to different feeds that then form beams as needed using ground based beamforming in a dynamic manner, which allows flexibility to meet changing an evolving traffic demands. However, at high frequencies (such as Ku band or Ka band) ground based beamforming typically requires a large number of feeds to form good quality beams and the per-feed bandwidth multiplied by the number of feeds gets too large for any RF spectrum to handle. For this reason, ground based beamforming has been limited to mobile-satellite service (MSS) systems where per-beam bandwidth is limited and the number of feed elements is also small.

Embodiments of the present technology use analog over free space optics (AoFSO) technology to generate the feeder links from a gateway to/from a satellite, thereby using optical signals to replace the normal Ku or Ka or V band RF spectrum. By modulating these optical wavelengths at the desired RF frequencies, it is possible to use ground based beamforming, even at high frequencies like Ka band, and with large numbers of feed elements, due to the high RF bandwidth available at optical frequencies.

Beneficially, with ground based beamforming, spot beams can be added, removed or reconfigured within a gateway to enable a satellite to operate from different orbital locations and to adapt to changes in traffic patterns or to new applications.

FIG. 2B will now be used to provided details of the GBBF 230 introduced in FIG. 2A, according to certain embodiments of the present technology. Referring to FIG. 2B, the GBBF 230 is shown as including a GBBF controller 232 and one thousand 1 to N splitters 234_1 to 234_1000, where N can equal, e.g., two hundred and fifty, but is not limited thereto. Each individual splitter 234_1 to 234_1000 (which can be referred to collectively as the splitters 234, or individually as a splitter 234) outputs N copies of the spot beam signal received by the splitter 234. For example, the splitter 234_1, which receives the spot beam signal_1, outputs N copies of the spot beam signal_1. The N outputs of each of the splitters 234, are provided to respective phase and amplitude weight elements 236, which can be implemented in hardware, but are more likely implemented in software and/or firmware. In accordance with certain embodiments, the function of the splitters 234 is performed using a digital signal processor (DSP) instead of N separate splitters. In other words, a DSP can perform the signal copying or replication. An output of each of the phase and amplitude weight elements 236 is provided to one of the two hundred and fifty summers 238_1 to 238_250. The outputs of the summers 238_1 to 238_250 are the baseband feed element signals that are frequency up-converted by the FUCs 244, filtered by the filters 246, and then provided to the EOMs 204, as shown in FIG. 2A, which was discussed above. The GBBF 230 can be implemented entirely in software. Alternatively, or additionally, the GBBF 230 can be implemented in hardware and/or firmware. The outputs of the phase and amplitude weight elements 236 can be referred to a component element signals. The outputs of the summers 238, which outputs are referred to as the baseband feed element signals above, can also be referred to as composite signals, since they are a composite of a plurality of component element signals. In the manner described above, these composite signals are frequency up-converted, filtered, electro-optically modulated, WDM multiplexed, amplified and optically transmitted to a satellite.

The splitters 234 and the weight elements 236 can be collectively referred to as a signal replication and forward beamforming weighting unit 233. Assuming there are one thousand spot beam signals provided to the signal replication and forward beamforming weighting unit 233, and two hundred and fifty feed elements on a satellite (to which the gateway forward link equipment 200 is transmitting a feeder uplink beam, e.g., 102u), then the GBBF controller 232 uses calibration signals (received from a calibration subsystem) to derive element specific amplitude and phase corrections that are applied individually to two hundred and fifty thousand component element signals (i.e., one thousand spot beam signals*two hundred and fifty feed elements=two hundred and fifty thousand component element signals). As noted above, a DSP can perform the signal copying or replication performed by the splitters 234. More generally, all of the functions of the elements described within the block labeled GBBF 230 can be implemented by a DSP. In other words, the GBBF 230 can be entirely or substantially entirely implemented using a DSP. Nevertheless, it is useful to shown and describe the elements shown in FIG. 2B in order to understand the operation of such a DSP.

The calibration subsystem from which the the GBBF controller 232 receives calibration signals can transmit and/or receive calibration signals upon which calibration measurements can be performed. These forward and return link measurements can be generally referred to as a beamforming calibration process, and can be used to initialize, update and refine the performance of RF service downlink beams (e.g., 106d, 110d, 114d and 118d in FIG. 1) and RF service uplink beams (e.g., 106u, 110u, 114u, 118u in FIG. 1). The calibration and pointing stations 150 in FIG. 1 can be part of such a calibration subsystem. To form a specific beam, the amplitude and phase weightings should be set to the appropriate values for each feed element, and should be effectively applied at the feed element apertures. For example, take two feed elements and assume a desired beam is formed with an amplitude of A1 and a phase of θ1 degrees for feed element one and an amplitude of A2 and a phase of ∝2 degrees for feed element two. In typical on board beamforming the beam forming operation is very close to the feed aperture, so it is much simpler to set these values correctly. However, with ground based beamforming, the signals traverse down independent paths, through the propagation media at different frequencies which may have differing amplitude and phase channels, and then through independent conversion paths. One of the paths may experience more amplitude attenuation and phase shift than the other. Without knowledge and compensation of this difference, the beam forming weights at the aperture will not be the desired values. Depending on the error experienced, the desired beam may be mispointed, misshaped, or even dispersed so grossly as to not be recognizable as a spot beam. However, if the value of the amplitude and phase difference between the element paths between the feed element aperture and the ground based beamforming operation is known, it is relatively simply to be compensated for by adjusting the feed coefficient weights or compensating for the shift before applying the feed weights. Consequently, in order for the GBBF 230 to function properly a calibration scheme can be used by a calibration subsystem to determine and compensate for the amplitude and phase variations between the feed element paths. Examples of such calibration subsystems and schemes for use with ground based beamforming are described in U.S. Pat. No. 7,787,819 to Walker et al., entitled "Ground-Based Beamforming for Satellite Communications Systems" and in an article entitled "Architecture, Implementation and Performance of Ground-Based Beam Forming in the DBSD G1 Mobile Satellite System" by Walker et al. (28th AIAA International Communications Satellite Systems Conference (ICSSC-2010)), each of which is incorporated herein by reference.

Space Segment Forward Link Equipment

FIG. 3 will now be used to describe space segment forward link equipment 300 according to an embodiment of the present technology. Such space segment forward link equipment 300, which can also be referred to as a forward link satellite subsystem 300, or more generally, as an optical communication subsystem, is configured to receive the optical signal that is transmitted from the ground based optical gateway subsystem 200 to the satellite that is carrying the space segment forward link equipment 300. The space segment forward link equipment 300 is also configured to convert the optical signal that it receives (from the ground based optical gateway subsystem 200) into electrical signals, and to produce service beams therefrom, wherein the service beams are for transmission from the satellite to service terminals ST.

Referring to FIG. 3, the forward link satellite subsystem 300 is shown as including receiver optics 302, an optical amplifier (OA) 304, a wavelength-division multiplexing (WDM) demultiplexer (DEMUX) 306, two hundred and fifty photodetectors (PDs) 308_1 to 308_250, two hundred and fifty filters 310_1 to 310_250, and two hundred and fifty low noise amplifiers (LNAs) 312_1 to 312_250. The forward link satellite subsystem 300 is also shown as including two hundred and fifty filters (FTRs) 316_1 to 316_250, high power amplifiers (HPAs) 318_1 to 318_250, harmonic filters (HFs) 320_1 to 320_250, test couplers (TCs) 322_1 to 322_250, orthomode junctions (OMJs) 324_1 to 324_250, and feed elements 326_1 to 326_250. The PDs 308_1 to 308_250 can be referred to individually as a PD 308, or collectively as the PDs 308. The filters 310_1 to 310_250 can be referred to individually as a filter 310, or collectively as the filters 310. The LNAs 312_1 to 312_250 can be referred to individually as an LNA 312, or collectively as the LNAs 312. The filters 316_1 to 316_250 can be referred to individually as a filter 316, or collectively as the filters 316. The HPAs 318_1 to 318_250 can be referred to individually as an HPA 318, or collectively as the HPAs 318. The HFs 320_1 to 320_250 can be referred to individually as an HF 320, or collectively as the HFs 320. The TCs 322_1 to 322_250 can be referred to individually as a TC 322, or collectively as the TCs 322. The OMJs 324_1 to 324_250 can be referred to individually as an OMJ 324, or collectively as the OMJs 324. The feed elements 326_1 to 326_250 can be referred to individually as a feed element 326, or collectively as the feed elements 326.

The receiver optics 302, which can also be referred to as a telescope, can includes optical elements such as mirrors, reflectors, filters and/or the like. The receiver optics 302 receives the optical feeder uplink beam that is transmitted through free-space to the satellite by the ground based optical gateway forward link subsystem 200, and provides the received optical feeder uplink beam (e.g., via an optical fiber) to the OA 304. A gimbal, and/or the like, can be used to control the steering of the receiver optics 302. When the optical feeder uplink beam reaches the satellite, the power of the optical feeder uplink beam is significantly attenuated compared to when it was transmitted by the ground based optical gateway subsystem 200. Accordingly, the OA 304 is used to amplify the received optical feeder uplink beam before it is provided to the WDM DEMUX 306. The OA 304 can be, e.g., an erbium-doped fiber amplifier (EDFA), but is not limited thereto. The output of the OA 304 can be referred to as an optically amplified received optical feeder uplink beam. The WDM DEMUX 306 demultiplexes (i.e., separates) the received optical feeder uplink beam (after it has been optically amplified) into two hundred and fifty separate optical signals, each of which is provided to a separate photodetector (PD) 308. Each PD 308 converts the optical signal it receives from the WDM DEMUX 306 to a respective RF electrical signal. The RF electrical signal produced by each PD 308 is provided to a respective filter (FTR) 310 (e.g., a bandpass filter) to remove unwanted frequency components and/or enhance desired frequency components. For an example, each filter 310 can pass frequencies within the range of 17.7-20.2 GHz, or within the range of 17.3-20.2 GHz, but are not limited thereto. The filtered RF electrical signal, which is output by each filter 310, is provided to a respective low noise amplifier (LNA) 312. Each LNA 312 amplifies the relatively low-power RF signal it receives from a respective filter 310 without significantly degrading the signals signal-to-noise ratio. The amplified RF signal that is output by each LNA 312 is provided to a filter 316. The filter 316_1 may have a passband of 17.7-20.2 GHz, or 17.3-20.2 GHz, but are not limited thereto.

Each HPA 318 amplifies the RF signal it receives so that the RF signal has sufficient power to enable transmission thereof from the satellite 100 in space to a service terminal ST, which may be on the ground. Each HPA 318 can be, e.g., a linearized traveling wave tube high power amplifier, but is not limited thereto. The signal that is output by each of the HPAs 318 can be referred to as an amplified RF signal. Each HF 320 is used to reduce out-of-band emissions caused by the nonlinearity caused by a respective HPA 318. Each HF 320 can be, e.g., a waveguide cavity filter, but is not limited thereto. Each test coupler TC 322 can be used for power monitoring, payload testing and/or performing calibrations based on signals passing therethrough. Each OMJ 324 adds either right hand circular polarization (RHCP) or left hand circular polarization (LHCP) to the RF signal that is passed through the OMJ. This allows for color reuse frequency band allocation, wherein each color represents a unique combination of a frequency band and an antenna polarization. This way a pair of feeder beams that illuminate adjacent regions can utilize a same RF frequency band, so long as they have orthogonal polarizations. Alternatively, each OMJ 324 adds either horizontal linear polarization or vertical linear polarization to the RF signal that is passed through the OMJ. Each feed element 326, which is an example of a feed element, converts the RF signal it receives, from a respective OMJ 324, to radio waves and feeds them to the rest of the antenna system (not shown) to focus the signal into a service downlink beam. A feed element 326 and the rest of an antenna can be collectively referred to as the antenna subsystem. All or some of the feed elements 326 can share a common reflector. Such reflector(s) is/are not shown in the Figures, to simply the Figures. The two hundred and fifty feed elements, element 326_1 to 326_250, form a multiple element antenna feed array. This multiple element antenna feed array is used to form spot beams (e.g., one thousand spot beams) as controlled by the GBBF 230.

Space Segment Return Link Equipment

Figure 4A:
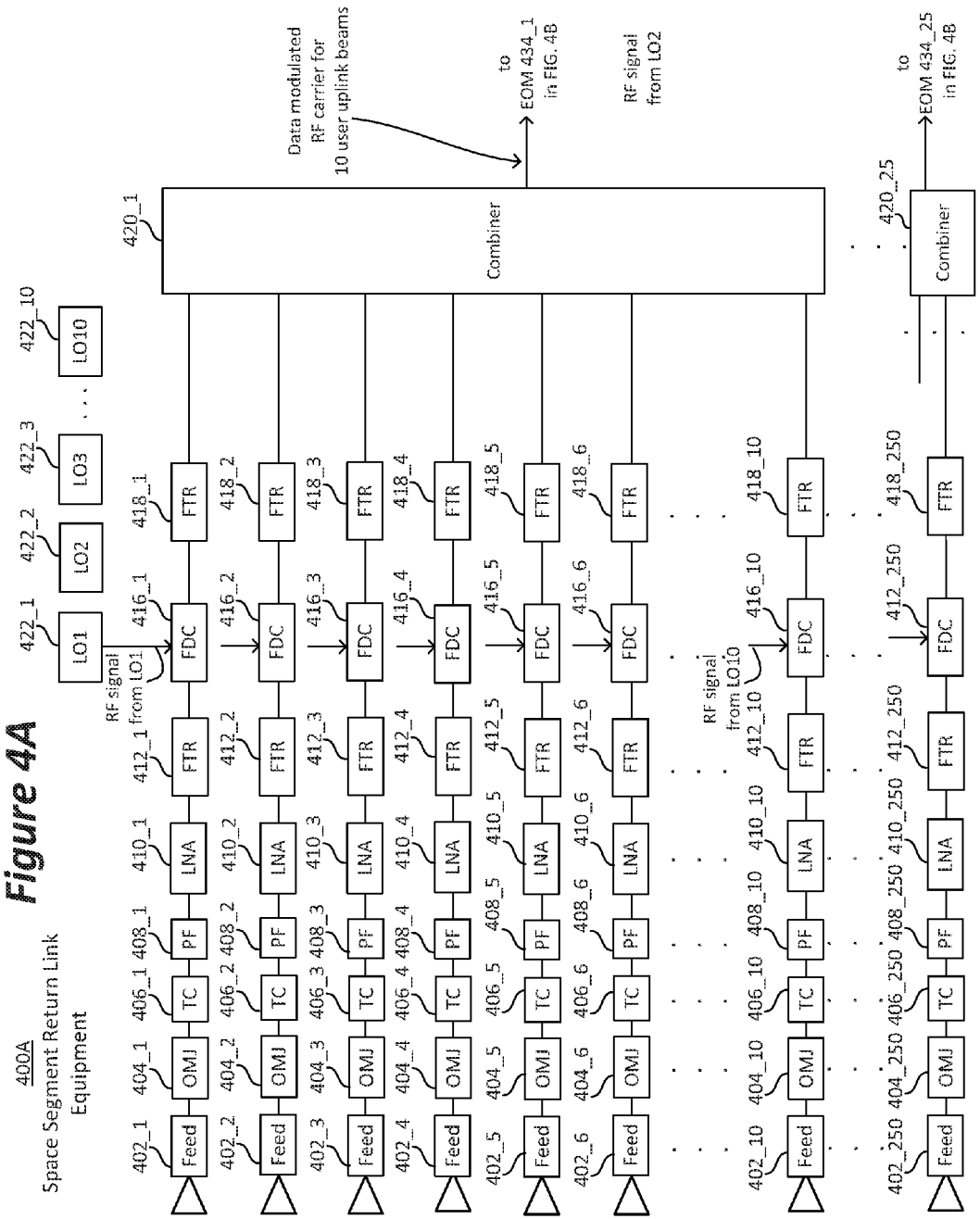
FIG. 4A depicts a portion of space segment return link equipment, according to alternative embodiments of the present technology.
Figure 4B:
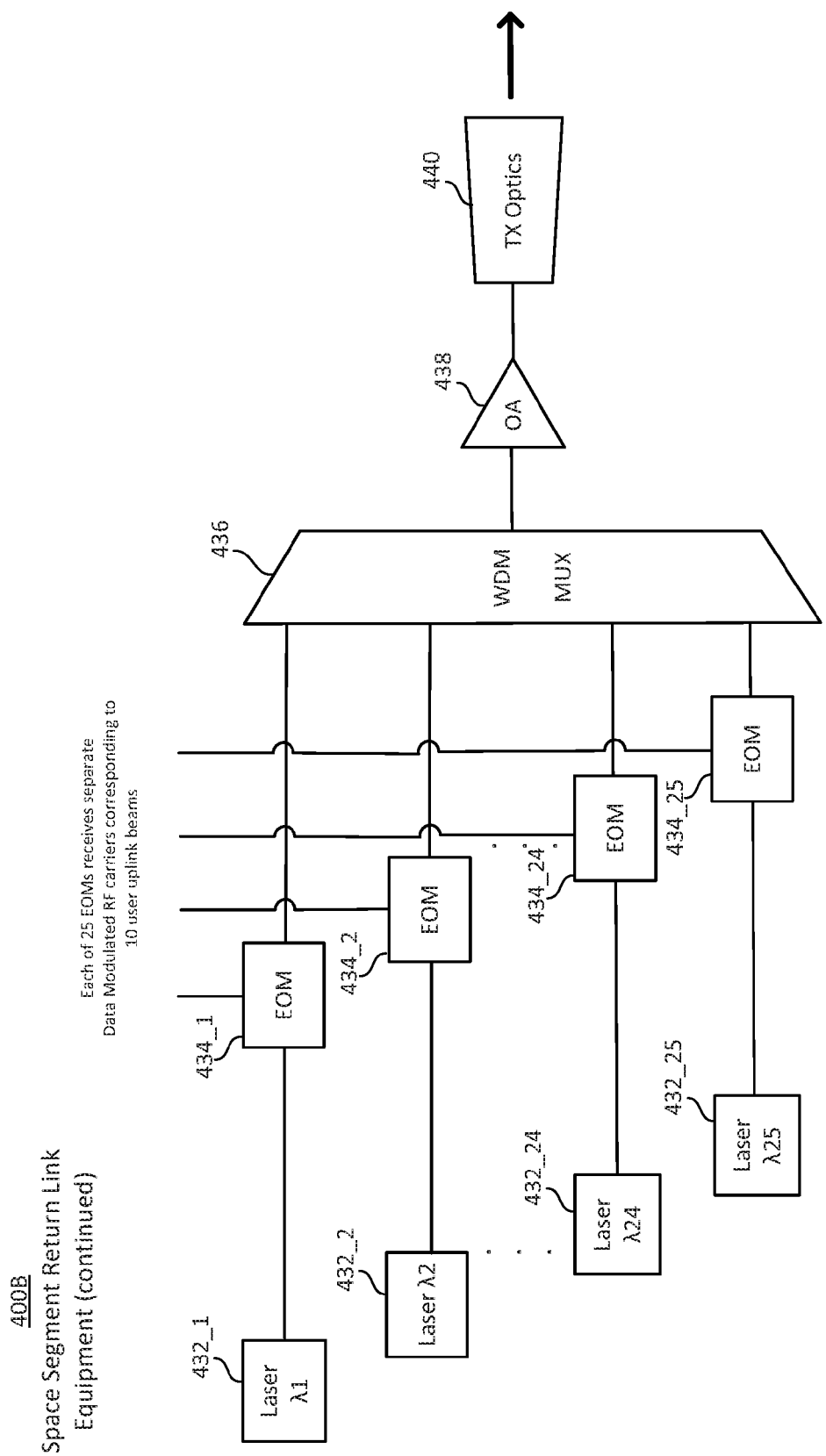
FIG. 4B depicts a further portion of space segment return link equipment, according to an embodiment of the present technology.

FIG. 4A will now be used to describe a portion of space segment return link equipment 400A, according to an embodiment of the present technology. Such space segment return link equipment 400A, which can also be referred to as a satellite return link subsystem 400A, or more generally, as an optical communication subsystem, is configured to receive the RF signals that are transmitted by service terminals ST to the satellite (e.g., 100) that is carrying the space segment return link equipment 400A. The space segment return link equipment 400A, together with the space segment return link equipment 400B in FIG. 4B, is also configured to convert the RF signals that it receives (from the service terminals ST) into optical signals, and to produce optical return feeder beams therefrom, wherein the optical return feeder beams are for transmission from the satellite (e.g., 100) to a ground based gateway (e.g., 105).

Referring to FIG. 4A, the portion of the space segment return link equipment 400A shown therein includes feed elements 402_1 to 402_250 (which can be referred to individually as a feed element 402, or collectively as the feed elements 402), orthomode junctions (OMJs) 404_1 to 404_250 (which can be referred to individually as an OMJ 404, or collectively as the OMJs 404), test couplers (TCs) 406_1 to 406_250 (which can be referred to individually as a TC 406, or collectively as the TCs 406), pre-select filters (PFs) 408_1 to 408_250 (which can be referred to individually as a PF 408, or collectively as the PFs 408), low noise amplifiers (LNAs) 410_1 to 410_250 (which can be referred to individually as an LNA 410, or collectively as the LNAs 410), and filters (FTRs) 412_1 to 412_250 (which can be referred to individually as a filter 412, or collectively as the filters 412). The portion of the space segment return link equipment 400A shown in FIG. 4A also includes frequency down-converters (FDCs) 416_1 to 416_250 (which can be referred to individually as a frequency down-converter 416, or collectively as the frequency down-converters 416), filters (FTRs) 418_1 to 418_250 (which can be referred to individually as a filter 418, or collectively as the filters 418), and local oscillators (LOs) 422_1 to 422_10 (which can be referred to individually as an LO 422, or collectively as the LOs 422). The portion of the space segment return link equipment 400A shown in FIG. 4A also includes combiners 420_1 to 420_25 (which can be referred to individually as a combiner 420, or collectively as the combiners 420).

Each feed element 402 gathers and focuses radio waves of a service uplink beam (e.g., 106$u$) and converts them to an RF signal that is provided to a respective OMJ 404. A feed element 402 and the rest of an antenna can be collectively referred to as the antenna or antenna system. In other words, an antenna, as the term is used herein, can include a feed element. All or some of the feed elements 402 can share a common reflector. Such reflector(s) is/are not shown in the Figures, to simply the Figures. Each OMJ 404 either passes through a right hand circular polarization (RHCP) or a left hand circular polarization (LHCP) RF signal. Each OMJ 404 can alternatively pass through either a horizontal or a vertical linear polarization RF signal. Each test coupler TC 406 can be used for power monitoring, payload testing and/or performing calibrations based on signals passing therethrough. Each pre-select filter (PF) 408 (e.g., a bandpass filter) is used to remove unwanted frequency components and/or enhance desired frequency components. For an example, each PF 408 can pass frequencies within the range of 29.5-30.0 GHz, but is not limited thereto. Each LNA 410 amplifies the relatively low-power RF signal it receives from a respective PF 408 without significantly degrading the signals signal-to-noise ratio. The amplified RF signal that is output by each LNA 410 is provided to a respective filter 412.

Each filter 412 allows frequencies to pass within a specified frequency range (e.g., 29.50-30.00 GHz), and the filters 418 that are downstream of the frequency down-converters 416 are used to filter out unwanted frequency components (e.g., unwanted mixed products) that result from the frequency down-conversions.

Each frequency down-converter 416 receives an RF signal from a filter 412 (which RF signal includes data from a uplink beam, and thus, can be referred to as an RF data signal) and an RF signal from an LO 422 (which can be referred to as an LO signal), and uses the LO signal to down-convert the RF data signal to a frequency range (e.g., 6.70-7.2 GHz, or 6.3-7.2 GHz, or some other frequency range within the 6-12 GHz band) that can be used for transmitting feeder downlink signals (e.g., 102$d$) to a gateway (e.g., 105). The output of each frequency down-converter 416 is provided to a filter 418. For example, frequency down-converter 416_1 provides its output to the filter 418_1, and the frequency down-converter 416_2 provides its output to the filter 418_2. The filter 418_1 can be a bandpass filter that allows frequencies to pass within a specified frequency range (e.g., 6.70-7.2 GHz, or 6.3-7.2 GHz, or some other frequency range within the 6-12 GHz band).

In the embodiment of FIG. 4A, the outputs of ten filters 418 are provided to a combiner 420. For example, the outputs of filters 418_1, 418_2, 418_3 . . . 418_10 are provided the combiner 420_1. Each combiner 420 combines the ten down-converted and filtered signals it receives into a combined signal that includes data modulated RF carriers for ten service uplink beams. In other words, the output of each combiner 420 includes data received from ten service uplink beams associated with at least ten service terminals ST. The output of each combiner 420 is provided to a separate EOM 434, as will be discussed below with reference to FIG. 4B.

FIG. 4B will now be used to describe a further portion of the space segment return link equipment 400B that is used to convert the data modulated RF carrier signals into a collimated optical downlink feeder beam that is aimed at a gateway. Referring to FIG. 4B, the portion of the space segment return link equipment 400B is shown as including twenty five lasers 432_1 to 432_25, twenty five electro-optical modulator (EOMs) 434_1 to 434_25, a wavelength-division multiplexing (WDM) multiplexer (MUX) 436, an optical amplifier (OA) 438 and transmitter optics 440. Each of these elements are described below.

The twenty five separate lasers 432_1 to 432_25 each emit light of a different wavelength within a specified wavelength range. The lasers can be referred to individually as a laser 432, or collectively as the lasers 432. Where the specified wavelength range is, for example, from 1560 nm to 1570 nm, then the laser 432_1 may emit light having a peak wavelength of 1560 nm, the laser 432_2 may emit light having a peak wavelength of 1560.4 nm, the laser 432_3 (not shown) may emit light having a peak wavelength of 1560.8 nm, . . . the laser 432_24 may emit light having a peak wavelength of 1669.6 nm, and the laser 432_25 may emit light having a peak wavelength of 1670.0 nm. In other words, the peak wavelengths emitted by the lasers 432 can occur at 0.4 nm intervals from 1560 nm to 1570 nm. The wavelength range from 1560 nm to 1570 nm, which is within the IR spectrum, is practical to use because IR lasers for use in communications are readily available. However, wider or narrow wavelength ranges, within the same or other parts of the optical spectrum, may alternatively be used. For example, it would also be possible to utilize a wavelength range within the 400 nm-700 nm visible spectrum. It is also possible that the wavelength range that is specified for use in producing the optical feeder downlink beam (e.g., 102d) is non-contiguous. For example, the wavelength range that is for use in producing the optical feeder downlink beam can be from 1535 nm to 1540 nm and from 1565 nm to 1575 nm. These are just a few examples, which are not intended to be all encompassing. Further, it is also possible that space segment return link equipment can alternatively include more or less than twenty five lasers (that each emit light of a different peak wavelength within a specified contiguous or non-contiguous wavelength range). Additionally, it is noted that the space segment return link equipment may include two or more of each of the lasers (that each emit light of a different peak wavelength within a specified contiguous or non-contiguous wavelength range) to provide for redundancy or backup. Each of the lasers 432 can be, for example, a diode-pumped infrared neodymium laser, although the use of other types of lasers are also within the scope of the embodiments described herein.

In accordance with certain embodiments, the space segment return link equipment 400B includes less lasers (e.g., twenty five lasers 432) for use in generating the optical feeder downlink beam that is aimed from the satellite 100 to the gateway 105, than the gateway forward link equipment 200 includes (e.g., two hundred and twenty five lasers 202) for generating the optical feeder uplink beam that is aimed from the gateway 105 to the satellite 100. This is made possible due to current asymmetric capacity requirements between the forward and return feeder links. More specifically, a feeder downlink beam (e.g., 102d) carries significantly less data than a feeder uplink beam (e.g., 102u), because service terminals ST typically download much more data than they upload.

On the return link, given the current asymmetric capacity requirements between the forward and return links, the space segment return link equipment can be implemented to handle less demand that the ground based forward link equipment. As an example, if each RF service uplink beam is assumed to have only 320 MHz per beam, then a total of 160 GHz needs to be sent from a satellite to a gateway on the optical feeder downlink beam. Several beams' frequencies can be grouped together to create a 4 GHz bandwidth which is then transmitted on each of twenty five laser wavelengths that are multiplexed together and transmitted to the ground. An alternative implementation would be to aggregate the 4 GHz spectrum with filtering post LNA to eliminate the RF frequency conversion and as above directly modulate the RF spectrum on each of the twenty five laser wavelengths. An alternative implementation would be to use only RF LNAs for each feed, modulate each 320 MHz segment of bandwidth onto a single laser and combine two hundred and twenty five laser wavelengths together, thus eliminating the need for RF frequency converters. Depending on the number of service beams and feeder beams required, one or the other configuration can be selected to provide the lowest mass solution.

The light emitted by each of the twenty five lasers 432, which can be referred to as an optical carrier signal, is provided (e.g., via a respective optical fiber) to a respective one of the twenty five separate EOMs 434_1 to 434_25. The EOMs can be referred to individually as an EOM 434, or collectively as the EOMs 434. Each of the EOMs 434 is an optical device in which a signal-controlled element exhibiting an electro-optic effect is used to modulate a respective beam of light. The modulation performed by the EOMs 434 may be imposed on the phase, frequency, amplitude, or polarization of a beam of light, or any combination thereof. In accordance with a specific embodiment, each of the EOMs 434 is a phase modulating EOM that is used as an amplitude modulator by using a Mach-Zehnder interferometer. In other words, each of the EOMs 434 can be implemented as a Mach-Zehnder modulator (MZM), which can be a Lithium Niobate Mach-Zehnder modulator, but is not limited thereto. In accordance with specific embodiments, each of the EOMs 434 is implemented as an MZM that produces an amplitude modulated (AM) optical waveform with a modulation index between 10% and 80% in order to maintain fidelity of an RF waveform (modulated therein) without too much distortion. The optical signal that is output by each of the EOMs 434 can be referred to as an optical data signal. The modulation scheme that is implemented by the EOMs 434 can result in double- or vestigial-sidebands, including both an upper sideband (USB) and a lower sideband (LSB). Alternatively single-sideband modulation (SSB) can be utilized to increase bandwidth and transmission power efficiency.

The twenty five separate optical data signals that are output by the fifty EOMs 434 are provided to the WDM MUX 436, which can also be referred to as a dense wavelength division multiplexing (DWDM) MUX. The WMD MUX 436 multiplexes (i.e., combines) the twenty five optical data signals, received from the twenty five EOMs 434, onto a single optical fiber, with each of the twenty five separate optical data signals being carried at the same time on its own separate optical wavelength within a specified contiguous wavelength range (e.g., from 1560 nm to 1570 nm) or non-contiguous wavelength range (e.g., from 1510 nm to 1535 nm, and from 1540 nm to 1565 nm). For example, as explained above, the twenty five optical data signals can have peak wavelengths that occur at 0.4 nm intervals from 1560 nm to 1570 nm, but are not limited thereto.

The signal that is output by the WMD MUX 436, which can be referred to as a wavelength division multiplexed optical signal, is provided to the optical amplifier (OA) 438. The OA 438 amplifies the wavelength division multiplexed optical signal so that the wavelength division multiplexed optical signal has sufficient power to enable transmission thereof from the satellite 100 in free-space to the gateway 105. The OA 438 can be an erbium-doped fiber amplifier (EDFA), but is not limited thereto. The output of the OA 438 can be referred to as an optically amplified wavelength division multiplexed optical signal.

The optically amplified wavelength division multiplexed optical signal, which is output by the OA 438, is provided (e.g., via an optical fiber) to the transmitter optics 440. The transmitter optics 440, which can also be referred to as a telescope, can includes optical elements such as lenses, mirrors, reflectors, filters and/or the like. The transmitter optics 440 outputs a collimated optical feeder downlink beam that is aimed at a satellite. A gimbal, and/or the like, can be used to control the steering of the transmitter optics 440. In accordance with an embodiment, the collimated optical feeder downlink beam has an aperture of about 40 cm, and a half beam divergence of about 0.0000012 radians, wherein the term "about" as used herein means+/−10 percent of a specified value. The use of other apertures and half beam divergence values are also within the scope of the embodiments described herein. The collimated optical feeder downlink beam, which is output by the transmitter optics 440, is transmitted in free-space to receiver optics in the gateway 105.

A space segment (e.g., a satellite 100) can have different optics that are used for transmitting an optical feeder downlink beam (e.g., 102d) to a gateway, than the optics that are used for receiving an optical feeder uplink beam (e.g., 102u) from a gateway. Alternatively, and preferably, to reduce the weight that needs to be carried by the space segment (e.g., a satellite 100), the same optics can be used for both transmitting an optical feeder downlink beam (e.g., 102d) to a gateway and for receiving an optical feeder uplink beam (e.g., 102u) from a gateway. More specifically, the TX optics 440 shown in FIG. 4B can be the same as the RX optics 302 shown in FIG. 3. Additional and/or alternative components can be shared between the space segment forward link equipment shown in FIG. 3 and the space segment return link equipment shown in FIGS. 4A and 4B. For example, the feed elements 326 in FIG. 3 can be the same as the feed elements 402 shown in FIG. 4A. For another example, the OMJs 324 in FIG. 3 can be the same as the OMJs 404 in FIG. 4A, if the OMJs are implement as a three-port device. These are just a few example, which are not intended to be all encompassing.

Referring again to the EOMs 434 in FIG. 4B, in accordance with certain embodiments of the present technology, each of the EOMs 434 modulates the optical signal it receives (e.g., via an optical fiber from a respective laser 432) with a separate RF signal that has already been modulated to include user data. For example, the EOM 434_1 modulates the optical signal it receives from the laser 431_1 with a data modulated RF carrier signal it receives from the combiner 420_1 (in FIG. 4A). The data modulated RF carrier signal that the EOM 434_1 receives from a combiner (420_1 in FIG. 4A) can include data corresponding to ten service uplink beams received from service terminals ST. Similarly, the EOMs 434_2 to 434_50 can each receive a different data modulated RF carrier signal, from a different combiner 420, with each data modulated RF carrier signal corresponding to a different group of ten service uplink beams received from service terminals ST. In this manner, the EOMs 434 can be collectively provided with data modulated RF carrier signals corresponding to two hundred and fifty service uplink beams (i.e., 25*10=250).

Gateway Return Link Equipment

Figure 5A:
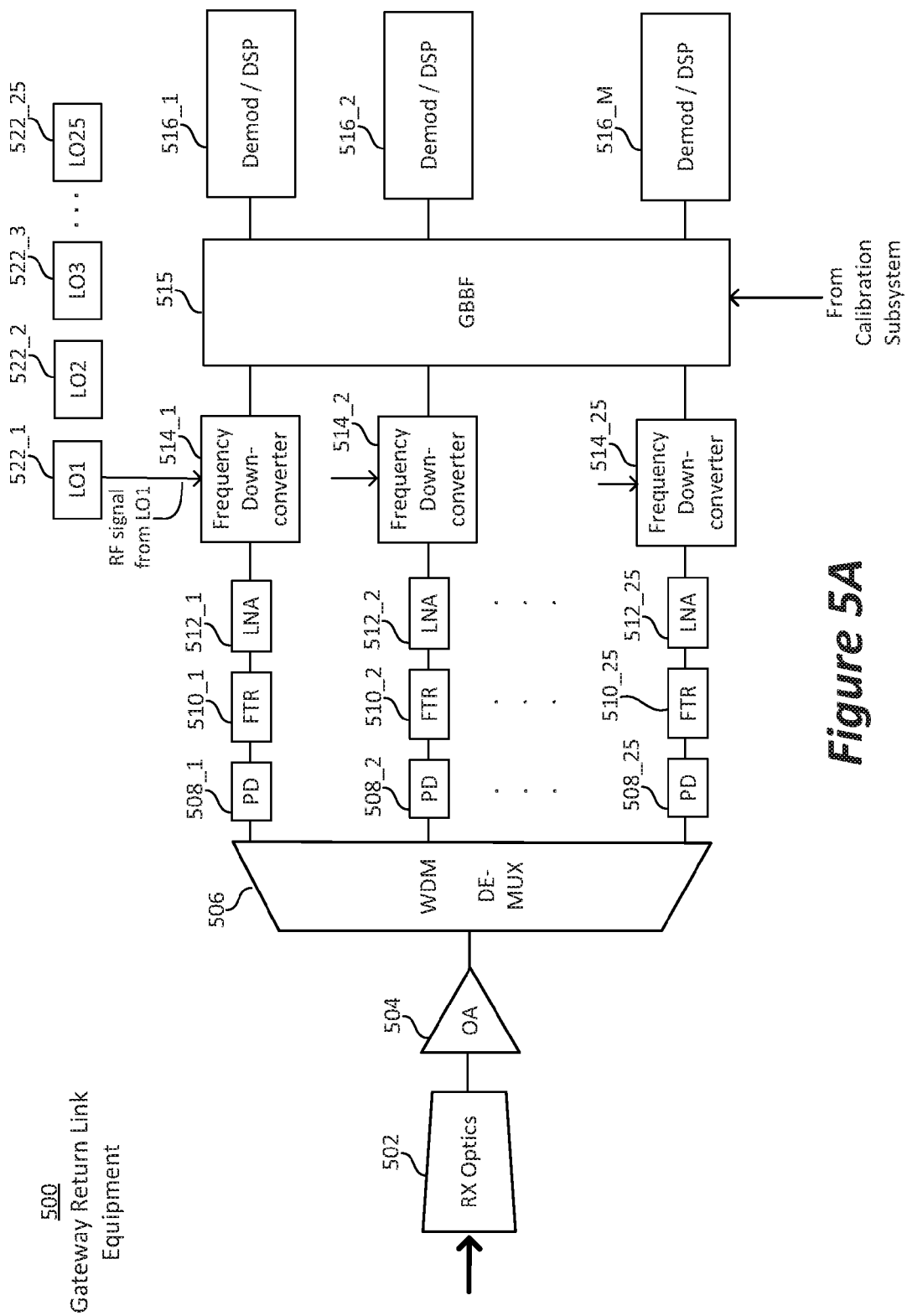
FIG. 5A depicts gateway return link equipment, according to an embodiment of the present technology.

FIG. 5A will now be used to describe gateway return link equipment 500, according to an embodiment of the present technology. Such gateway return link equipment 500 can also be referred to as an optical gateway return link subsystem 500, or more generally, as an optical communication subsystem. Referring to FIG. 5A, the optical gateway return link subsystem 500 is shown as including receiver optics 502, an optical amplifier (OA) 504, a wavelength-division multiplexing (WDM) demultiplexer (DEMUX) 506, twenty five photodetectors (PDs) 508_1 to 508_25, twenty five filters (FTRs) 510_1 to 510_25, twenty five low noise amplifiers (LNAs) 512_1 to 512_25, and twenty five frequency down-converters (FDCs) 514_1 to 514_25. The optical gateway return link subsystem 500 is also shown as including a ground based beamformer (GBBF) 515, M demodulator and digital signal processor (DSP) blocks 516_1 to 516_M, and twenty five local oscillators (LOs) 522_1 to 522_25 (which can be referred to individually as an LO 522, or collectively as the LOs 522).

The receiver optics 502, which can also be referred to as a telescope, can includes optical elements such as mirrors, reflectors, filters and/or the like. The receiver optics 502 receives the optical feeder downlink beam (e.g., 102d) that is transmitted through free-space from a space segment (e.g., a satellite 100), by the space based return link subsystem 400A and 400B, and provides the received optical feeder downlink beam (e.g., via an optical fiber) to the OA 504. A gimbal, and/or the like, can be used to control the steering of the receiver optics 502. When the optical feeder downlink beam reaches the gateway, the power of the optical feeder downlink beam is significantly attenuated compared to when it was transmitted by the space based return link subsystem. Accordingly, the OA 504 is used to amplify the received optical feeder downlink beam before it is provided to the WDM DEMUX 506. The OA 504 can be, e.g., an erbium-doped fiber amplifier (EDFA), but is not limited thereto. The output of the OA 504 can be referred to as an optically amplified received optical feeder downlink beam. The WDM DEMUX 506 demultiplexes (i.e., separates) the received optical feeder uplink beam (after it has been optically amplified) into fifty separate optical signals, each of which is provided to a separate photodetector (PD) 508. Each PD 508 converts the optical signal it receives from the WDM DEMUX 506 to a respective RF electrical signal. The RF electrical signal produced by each PD 508 is provided to a respective filter (FTR) 510 (e.g., a bandpass filter) to remove unwanted frequency components and/or enhance desired frequency components. For an example, where frequency down-conversions were performed on the satellite (by the FDCs 416 of the space segment return link equipment 400A), each filter 510 can pass frequencies within the range of 6.70-7.2 GHz, or within the range of 6.3-7.2 GHz, but are not limited thereto. For another example, where frequency down-conversions were not performed on the satellite, each filter 510 can pass frequencies within the range of 29.5-30 GHz, but are not limited thereto. The filtered RF electrical signal, which is output by each filter 408, is provided to a respective low noise amplifier (LNA) 512. Each LNA 512 amplifies the relatively low-power RF signal it receives from a respective filter 510 without significantly degrading the signals signal-to-noise ratio. The amplified RF signal that is output by each LNA 512 is provided to a respective frequency down-converter 514, the output of which is provided to the GBBF 515, which outputs signals provided to demodulator and DSP blocks 516.

Each frequency down-converter 514 receives an RF signal from an LNA 512 (which RF signal includes data from subscriber terminals STs, and thus, can be referred to as an RF data signal) and an RF signal from an LO 452 (which can be referred to as an LO signal), and uses the LO signal to down-convert the RF data signal to baseband. The baseband data signal output by each frequency down-converter 514 is provided to the GBBF 515. The GBBF 515 can be referred to more specifically as the return link GBBF 515, so as to distinguish it from the GBBF 230, which can be referred to more specifically as the forward link GBBF 230. The return link GBBF 515 uses calibration information received from a calibration subsystem, to produce M baseband spot beams (where, M can equal 1000 beams as on the forward link, or in some systems, the forward and return beam counts could be different from one another) Each of the M spot beam signals is provided to a respective demodulator and DSP block 516. Each demodulator and DSP block 516 demodulates the baseband spot beam signal it receives, and performs digital signal processing thereon. Such a demodulated data signal can be used to provide data to, or request data from, a server, client and/or the like that is coupled to a network (e.g., the network 140 in FIG. 1).

A gateway (e.g., 105) can have different optics that are used for transmitting an optical feeder uplink beam (e.g., 102u) to a space segment (e.g., satellite 100), than the optics that are used for receiving an optical feeder downlink beam (e.g., 102d) from a space segment. Alternatively, a gateway can use the same optics for both transmitting an optical feeder uplink beam (e.g., 102u) to a space segment and for receiving an optical feeder downlink beam (e.g., 102d) from a space segment. More specifically, the RX optics 502 shown in FIG. 5A can be the same as the TX optics 210 shown in FIG. 2A.

Figure 5B:
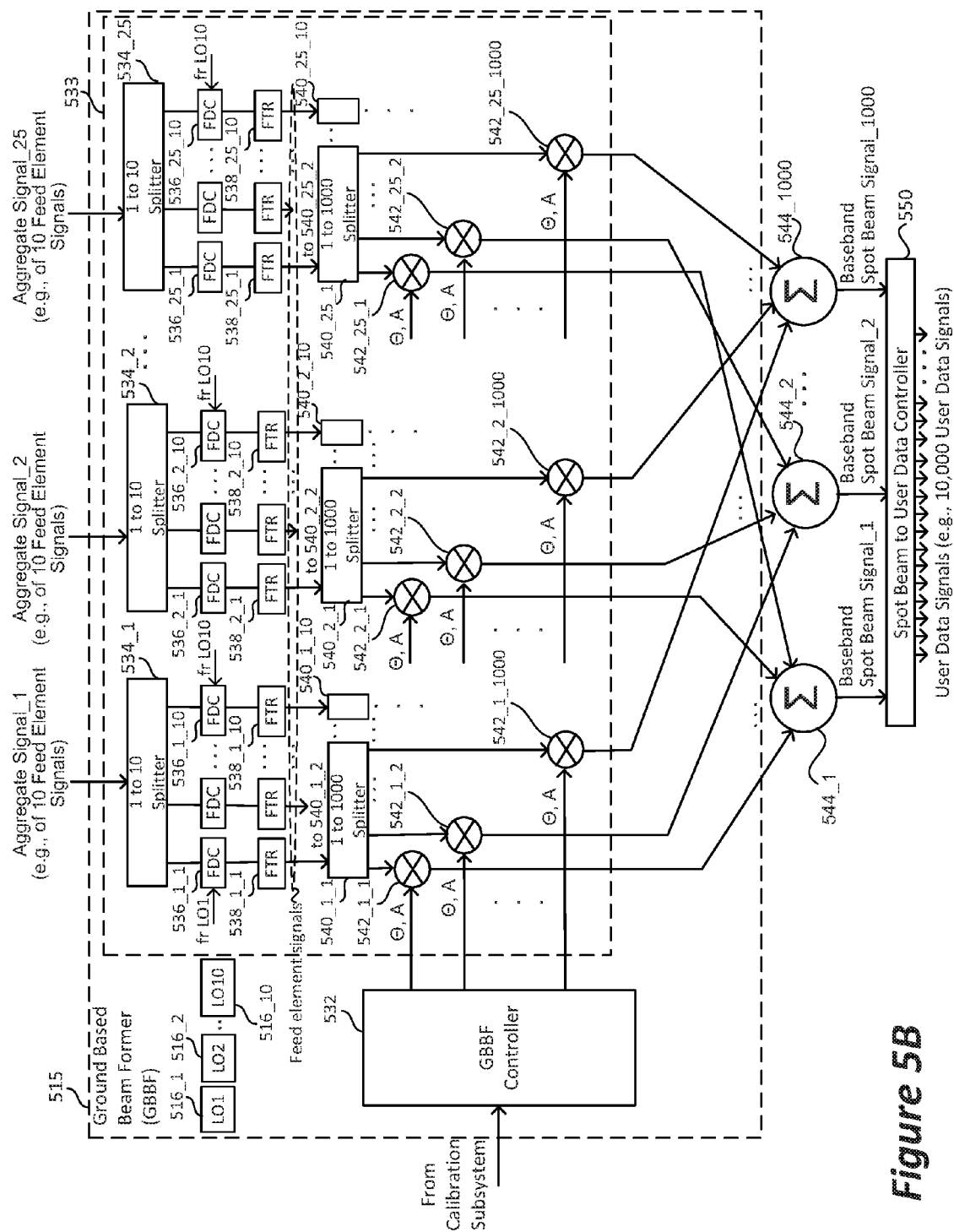
FIG. 5B depicts components of the ground based beamformer (GBBF) introduced in FIG. 5A, according to an embodiment of the present technology.

FIG. 5B will now be used to provide details of the return link GBBF 515 introduced in FIG. 5A, according to certain embodiments of the present technology. Referring to FIG. 5B, the GBBF 515 is shown as including a GBBF controller 532 and twenty five one-to-ten (1 to 10) splitters 534_1 to 534_25. Each individual splitter 534_1 to 534_25 (which can be referred to collectively as the splitters 534, or individually as a splitter 534) receives a respective one of the twenty five aggregate signals (aggregate signal_1, aggregate signal_2 . . . aggregate signal_25) and outputs ten copies of the aggregate signal received by the splitter 534. The aggregate signal received by each of the splitters 524 is an aggregate of ten feed element signals, each of which corresponds to an output of one of the combiners 420 shown in and described above with reference to FIG. 4A (which output is provided to one of the EOMs 434 in FIG. 4B). The ten outputs of each of the splitters 534 are provided to a different one of ten frequency down converters (FDCs) 536. Each of the FDCs receives a different RF signal from a different one of ten local oscillators (LOs) 516_1 to 516_10 (which can be referred to individually as an LO 516, or collective as the LOs 516), and thereby frequency shifts each of the copies of an aggregate signal. This way when the ten separately frequency shifted copies of the aggregate signal are passed through a respective one of the filters (FTRs) 538, which have a common band pass frequency range, the ten feed elements signals that were included in an aggregate signal are separated into ten separate feed element signals at the outputs of the FTRs 538. In the embodiment shown in FIG. 5B, there are twenty five groups of ten FDCs 536, and thus a total of two hundred and fifty FDCs 536, and there are a total of twenty five groups of ten FTRs 538, and thus a total of two hundred and fifty FTRs 538. In the manner described above, the outputs of the two hundred and fifty filters 538 are two hundred and fifty feed element signals that correspond to the outputs of the FTRs 418 described above with reference to FIG. 4A. In accordance with certain embodiments, the functions of the splitters 534, the FDCs 536, the FTRs 538 and the splitters 540 are performed using a digital signal processor (DSP) instead of N separate splitters. In other words, a DSP can perform the signal copying or replication.

In order to form one thousand spot beams signals from the two hundred and fifty feed element signals (that are respectively output from the two hundred and fifty FTRs 538 in FIG. 5B), each of the feed element signals is provided to a respective one-to-one thousand (1 to 1000) splitter 540. Each individual splitter 540 receives a respective one of the the two hundred and fifty feed element signals and outputs one thousand copies of the feed element signal received by the splitter 540. Each copy of a feed element signals is provided to a respective phase and amplitude weight elements 542, which can be implemented in hardware, but are most likely implemented in software and/or firmware. The GBBF controller 532 uses calibration signals (received from a calibration subsystem) to derive element specific amplitude and phase corrections that are provided to the phase and amplitude weight elements 542, to thereby apply the corrections to the component element signals provided thereto. An output of each of the phase and amplitude weight elements 542 is provided to one of one thousand summers 544_1 to 544_1000 (which can be referred to individually as a summer 544, or collectively as the summers 544). The outputs of the summers 544_1 to 544_1000 are the baseband spot beam signals that are provided to a spot beam to user data controller 550, which can be considered part of the GBBF 515, or can be considered external thereto. In the embodiment shown, the spot beam to user data controller 550 maps the one thousand spot beam signals output by the summers 544 to ten thousand user data signals. The user data signals are what can be provided to the demodulator and DSP blocks 516 shown in FIG. 5A, which was discussed above.

The GBBF 515 can be implemented entirely in software. Alternatively, or additionally, the GBBF 515 can be implemented in hardware and/or firmware. The outputs of the phase and amplitude weight elements 542 can be referred to a component element signals. The outputs of the summers 544, which outputs are referred to as the baseband spot beam signals above, can also be referred to as composite signals, since they are a composite of a plurality of component element signals. The splitters 534 and 540 and the weighting elements 542 can be collectively referred to as a signal replication and reverse beamforming weighting unit 533. The same calibration subsystem that provides calibration signals to the GBBF controller 232 can provide calibration signals to the GBBF controller 532. The GBBF controller 532, which receives the calibration signals, can be the same as the GBBF controller 232, or distinct therefrom.

As noted above, a DSP can perform the signal copying or replication performed by the splitters 534, the FDCs 536, the FTRs 538 and the splitters 540. More generally, all of the functions of the elements described within the block labeled GBBF 515 can be implemented by a DSP. In other words, the GBBF 515 can be entirely or substantially entirely implemented using a DSP. Nevertheless, it is useful to shown and describe the elements shown in FIG. 5B in order to understand the operation of such a DSP. The spot beam to user data controller 550 can also be implemented by the DSP.

Embodiments of the present technology described herein enable analog over free space optics (AoFSO) technology to be used on gateway to/from satellite links, replacing the normal Ku or Ka or V band spectrum. As described above, analog modulation of a number of wavelengths of light that are Wavelength Division Multiplexed (WDM) into a single laser beam from earth to space, and detected by photodetectors on the satellite. By modulating these optical wavelengths at the desired RF frequencies, it is possible to use GBBF, even at high frequencies like Ka band, and with large numbers of feed elements, due to the high RF bandwidth available at optical frequencies.

Currently envisioned free space optical spacecraft architectures use demodulation of the optical signal, followed by routing to user link pathways and remodulation of the signal on user link RF frequencies. Using embodiments of the present technology described herein it is also possible for ground based beamforming to be used within a gateway where a channelizer and/or router onboard a satellite may or may not be present, but the input segments from the feederlink on the forward link (or to the feederlink on the return link) are routed to (onboard) feed elements meant to form user beams (also referred to as spot beams). In embodiments of the present technology that use ground based beamforming, the ground system creates and uses the proper amplitude and phase coefficients to form the desired user beams (also referred to as spot beams). on a dynamic basis. By contrast, in an onboard beamforming (OBBF) system, the phase and amplitude coefficients are typically created onboard a satellite using analog or digital hardware. In any case, there is a one-to-one correspondence between the number of feed elements onboard and the number of feederlink band segments, also referred to as feed element signals, carrying signals for that feed. With a large number of feed elements and a high bandwidth per beam, it becomes impossible to find the feederlink spectrum needed at RF frequencies, but is not a problem at optical frequencies.

An advantage of the optical approach for HTS broadcast and other satellite applications is that it allows for flexible antenna beam forming with GBBF for large signal bandwidth without the limitation associated with the available gateway uplink and downlink spectrum at RF frequencies. This approach allows for the flexible generation of multiple beams from an array fed reflector. In addition, in embodiments where the communication signal is modulated at the transmit (forward) and receive (return) RF frequencies when applicable no frequency conversion is required on the satellite, further simplifying the payload design. However for increased flexibility, frequency conversion can still be applied on the satellite if desired.

Methods

Figure 6:
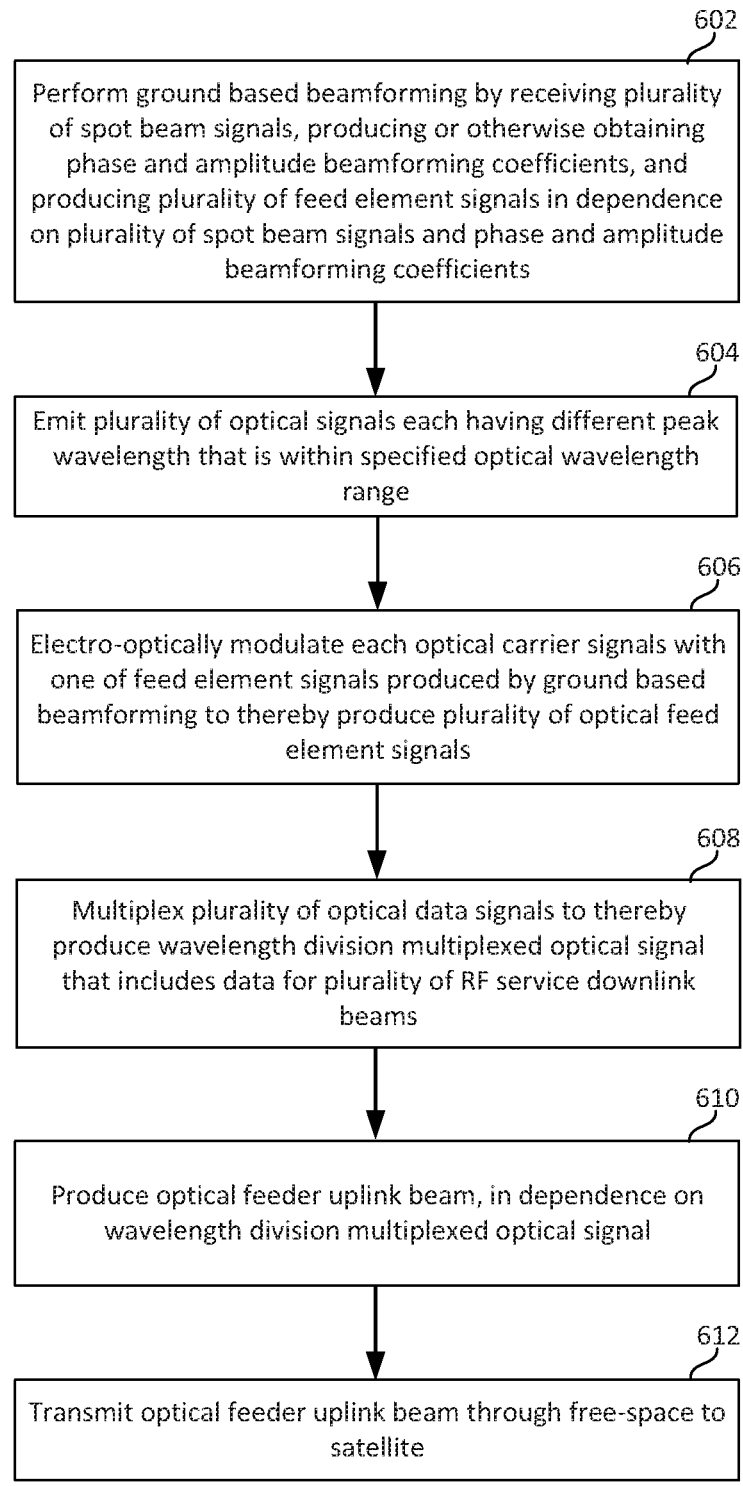
FIG. 6 is a high level flow diagram that is used to summarize methods for enabling a ground based subsystem to produce and transmit an optical feeder uplink beam to a satellite, according to certain embodiments of the present technology.

FIG. 6 will now be used to summarize methods for enabling a ground based subsystem (e.g., the gateway forward link equipment 200 in FIG. 2A) to produce and transmit an optical feeder uplink beam (e.g., 102u in FIG. 1) to a satellite (e.g., 100 in FIG. 1) that includes a multiple element antenna feed array and that is configured to receive the optical feeder uplink beam and in dependence thereon use the multiple element antenna feed array to produce and transmit a plurality of RF service downlink beams (e.g., 106d, 110d, 114d and 118d in FIG. 1) to service terminals ST. In accordance with certain embodiments, a specified RF frequency range within which the satellite is configured to produce and transmit a plurality of RF service downlink beams is a downlink portion of the Ka band. The downlink portion of the Ka band can be from 17.7 GHz to 20.2 GHz, and thus, have a bandwidth of 2.5 GHz. Alternatively, the downlink portion of the Ka band can be from 17.3 GHz to 20.2 GHz, and thus, have a bandwidth of 2.9 GHz. These are just a few examples, which are not intended to be all encompassing.

Referring to FIG. 6, step 602 involves performing ground based beamforming by receiving a plurality of spot beam signals, producing or otherwise obtaining phase and amplitude beamforming coefficients, and producing a plurality of feed element signals in dependence on the plurality of spot beam signals and the phase and amplitude beamforming coefficients. Step 602 can be performed, e.g., by the GBBF 230 described above with reference to FIGS. 2A and 2B. Prior to step 602, the method can involve receiving a set of user data signals (e.g., ten thousand user data signals), and combining subsets of the user data signals into the spot beam signals (e.g., one thousand spot beam signals) that are used for the ground based beamforming, which steps can be performed by the user data to spot beam controller 220 discussed above with reference to FIG. 2A.

Still referring to FIG. 6, step 604 involves emitting a plurality of optical signals each having a different peak wavelength that is within a specified optical wavelength range. Step 604 can be performed by the lasers 202 described above with reference to FIG. 2A. The specified optical wavelength range may be within the C-band and/or L-band optical wavelengths, as explained above. Further, as explained above, the specified optical wavelength range can be a contiguous optical wavelength range within an IR spectrum, or a non-contiguous optical wavelength range within the IR spectrum. As noted above, visible and/or other optical wavelengths may alternatively be used.

Step 606 involves electro-optically modulating each of the optical carrier signals with one of the feed element signals produced by the ground based beamforming to thereby produce a plurality of optical feed element signals. Step 606 can be performed by the EOMs 204 described above with reference to FIG. 2A. The feed element signals may be frequency up-converted (e.g., by the FUCs 244 in FIG. 2A) and filtered (e.g., by the FTRs 246 in FIG. 2A) prior to the electro-optically modulating Step 608 involves multiplexing the plurality of optical data signals to thereby produce a wavelength division multiplexed optical signal that includes data for the plurality of RF service downlink beams. Step 610 can be performed using the WDM MUX 206 discussed above with reference to FIG. 2A.

Step 610 involves producing an optical feeder uplink beam, in dependence on the wavelength division multiplexed optical signal, and step 612 involves transmitting the optical feeder uplink beam through free-space to the satellite. Steps 610 and 612 can be performed by the transmitter optics 210 discussed above with reference to FIG. 2A. The optical amplifier (OA) 208 discussed above with reference to FIG. 2A can also be used to perform step 610.

In accordance with certain embodiments, each of the plurality of optical data signals resulting from the electro-optically modulating at step 608 has an RF frequency within the same specified RF frequency range within which the satellite (e.g., 100) is configured to transmit the plurality of RF service downlink beams. In such embodiments, beneficially, because RF frequencies of the optical data signals resulting from the electro-optically modulating are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam. In other words, the space segment forward link equipment 300 in FIG. 3 beneficially does not need any frequency down-converters or any other type of frequency conversion equipment.

Figure 7:
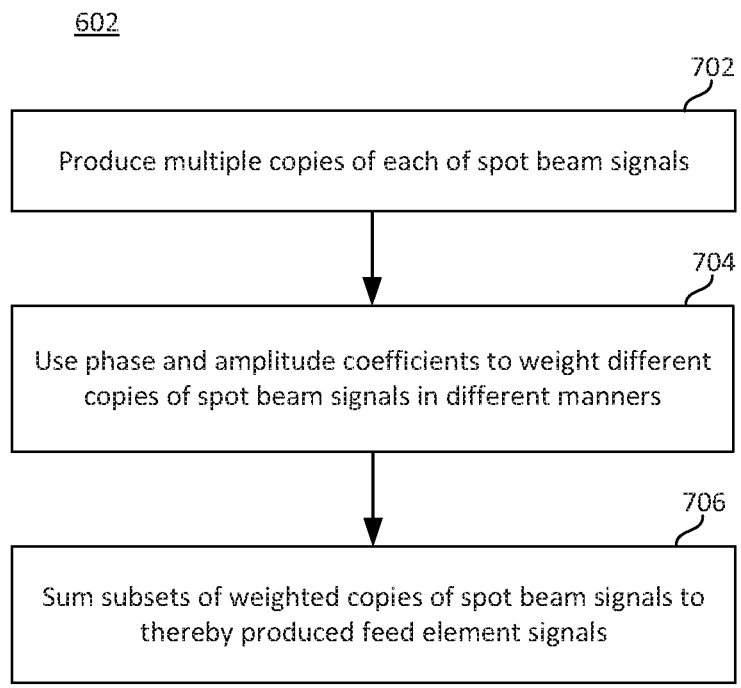
FIG. 7 is a high level flow diagram that is used to describe additional details of one of the steps introduced with reference to FIG. 6, according to certain embodiments of the present technology.

Additional details of step 602 according to certain embodiments of the present technology, which can be performed by the GBBF 230 described above with reference to FIGS. 2A and 2B, will now be described with reference to FIG. 7. More specifically, FIG. 7 is used to explain additional details of how the ground based beamforming can be performed at step 602. Referring to FIG. 7, step 702 involves produces multiple copies of each of the spot beam signals. Step 702 can be performed by the splitters 234 described above with reference to FIG. 2B.

Still referring to FIG. 7, step 704 involves using the phase and amplitude coefficients to weight different copies of the spot beam signals in different manners. Step 704 can be performed by the weight elements 236 described above with reference to FIG. 2B.

Step 706 involves summing subsets of the weighted copies of the spot beam signals to thereby produced the feed element signals. Step 706 can be performed by the summers 238 described above with reference to FIG. 2B. The feed element signals produced at step 706 may be frequency up-converted and filtered prior to the electro-optically modulating that is performed at step 604.

More generally, steps 702, 704 and 706 can be performed by the signal replication and forward beamforming weighting unit 233 described above with reference to FIG. 2B.

Further details of the methods described with reference to FIGS. 6 and 7 can be appreciated from the above description of FIGS. 1-5.

Certain embodiments of the present technology described above relate to a ground based subsystem for use in transmitting an optical feeder uplink beam to a satellite that includes a multiple element antenna feed array and that is configured to input the optical feeder uplink beam and in dependence thereon use the multiple element antenna feed array to produce and transmit a plurality of RF service downlink beams to service terminals. The ground based subsystem can include a ground based beamformer (GBBF), a plurality of lasers, a plurality of electro-optical modulators (EOMs), a wavelength-division multiplexing (WDM), an optical amplifier, and transmitter optics. The GBBF can be configured to accept a plurality of spot beam signals, produce or otherwise obtain phase and amplitude beamforming coefficients, and output a plurality of feed element signals in dependence on the plurality of spot beam signals and the phase and amplitude beamforming coefficients. Each of the lasers can be operable to emit an optical signal having a different peak wavelength within a specified optical wavelength range. Each EOM of the plurality of EOMs can be configured to accept an optical carrier signal from a respective one of the plurality of lasers, accept a different one of the plurality of feed element signals from the GBBF, which may be frequency up-converted and filtered prior to being accepted by the EOM, and output a respective optical feed element signal in dependence on the optical carrier signal and the feed element signal accepted by the EOM. The WDM multiplexer can be configured to accept the optical feed element signals output by the plurality of EOMs, and combine the plurality of optical feed element signals into a wavelength division multiplexed optical signal. The optical amplifier can be configured to amplify the wavelength division multiplexed optical signal to thereby produce an optically amplified wavelength division multiplexed optical signal. The transmitter optics can be configured to accept the optically amplified wavelength division multiplexed optical signal and transmit an optical feeder uplink beam to the satellite in dependence thereon. The ground based subsystem can also include a user data to spot beam controller configured to accept a set of user data signals and combine subsets of the user data signals into the spot beam signals that are provided to the GBBF.

In accordance with certain embodiments, the GBBF is further configured to produce multiple copies of each of the spot beam signals accepted by the GBBF, use the phase and amplitude coefficients to weight different copies of the spot beam signals in different manners, and sum subsets of the weighted copies of the spot beam signals to thereby produce the feed element signals, which may be frequency up-converted and filtered prior to being accepted by the EOMs.

The ground based subsystem can also include a plurality of frequency up-converters each of which is configured to frequency-up convert one of the feed element signals output by the GBBF before the feed element signal is provided to one of the EOMs. The frequency up-converters can more specifically be configured to cause the the optical feed element signals output by the plurality of EOMs to each have an RF frequency within a same specified RF frequency range within which the satellite is configured to transmit the plurality of RF service downlink beams. Additionally, the ground based subsystem can include a plurality of filters each of which is configured to filter one of the feed element signals after the feed element signal has been frequency up-converted, but prior to the feed element signal being provided to one of the EOMs.

In accordance with certain embodiments, the optical feed element signals output by the plurality of EOMs each have an RF frequency within a same specified RF frequency range within which the satellite is configured to transmit the plurality of RF service downlink beams. In such embodiments, because RF frequencies of the optical feed element signals output by the plurality of EOMs are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam.

In accordance with certain embodiments, a specified RF frequency range within which the satellite is configured to produce and transmit the plurality of RF service downlink beams comprises a downlink portion of the Ka band. For example, the downlink portion of the Ka band can be from 17.7 GHz to 20.2 GHz, and thus, have a bandwidth of 2.5 GHz. For another example, the downlink portion of the Ka band can be from 17.3 GHz to 20.2 GHz, and thus, have a bandwidth of 2.9 GHz.

In accordance with certain embodiments, an optical wavelength range of the optical feeder uplink beam is a contiguous or non-contiguous optical wavelength range within an infrared (IR) spectrum.

Certain embodiments of the present technology are related to a method for enabling a ground based subsystem to produce and transmit an optical feeder uplink beam to a satellite that includes a multiple element antenna feed array and that is configured to accept the optical feeder uplink beam and in dependence thereon use the multiple element antenna feed array to produce and transmit a plurality of RF service downlink beams to service terminals. Such a method can include performing ground based beamforming by accepting a plurality of spot beam signals, producing or otherwise obtaining phase and amplitude beamforming coefficients, and producing a plurality of feed element signals in dependence on the plurality of spot beam signals and the phase and amplitude beamforming coefficients. The method can also include emitting a plurality of optical carrier signals each having a different peak wavelength that is within a specified optical wavelength range, and electro-optically modulating each of the optical carrier signals with one of feed element signals produced by the ground based beamforming to thereby produce a plurality of optical feed element signals, wherein the feed element signals may be frequency up-converted and filtered prior to the electro-optically modulating. The method can further include multiplexing the plurality of optical feed element signals to thereby produce a wavelength division multiplexed optical signal that includes data for the plurality of RF service downlink beams. The method can also include producing an optical feeder uplink beam, in dependence on the wavelength division multiplexed optical signal, and transmitting the optical feeder uplink beam through free-space to the satellite. A method according to the embodiments described herein can also include accepting a set of user data signals, and combining subsets of the user data signals into the spot beam signals that are used for the ground based beamforming.

In accordance with certain embodiments, the ground based beamforming can further include producing multiple copies of each of the spot beam signals, using the phase and amplitude coefficients to weight different copies of the spot beam signals in different manners, and summing subsets of the weighted copies of the spot beam signals to thereby produced the feed element signals, which may be frequency up-converted and filtered prior to the electro-optically modulating.

A method can also include frequency-up converting and filtering the feed element signals produced by the ground based beamforming prior to the electro-optically modulating. The frequency up-converting can cause the the optical feed element signals resulting from the electro-optically modulating to each have an RF frequency within a same specified RF frequency range within which the satellite is configured to transmit the plurality of RF service downlink beams.

In accordance with certain embodiments, the optical feed element signals resulting from the electro-optically modulating each have an RF frequency within a same specified RF frequency range within which the satellite is configured to transmit the plurality of RF service downlink beams. In such embodiments, because RF frequencies of the optical feed element resulting from the electro-optically modulating are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam.

Certain embodiments of the present technology are related to a ground based subsystem for use in transmitting an optical feeder uplink beam to a satellite that includes a multiple element antenna feed array and that is configured to accept the optical feeder uplink beam and in dependence thereon use the multiple element antenna feed array to produce and transmit a plurality of RF service downlink beams to service terminals. The ground based subsystem can include a ground based beamformer (GBBF) including a GBBF controller, a signal replication and forward beamforming weighting unit that is controlled by the GBBF controller, and a plurality of summers. The GBBF controller can be configured to produce phase and amplitude beamforming coefficients in dependence on calibration information accepted from a calibration subsystem. The signal replication and forward beamforming weighting unit can be configured to replicate each of a plurality of spot beam signals, weight each of the replicated spot beam signals in dependence on phase and amplitude beamforming coefficients produced by the GBBF controller, and output a set of phase and amplitude weighted signals. The plurality of summers can be configured to sum respective subsets of the phase and amplitude weighted signals to thereby produce a plurality of feed element signals. The ground based subsystem can also include a plurality of lasers, a plurality of electro-optical modulators (EOMs), a wavelength-division multiplexing (WDM) multiplexer, an optical amplifier, and transmitter optics. Each of the lasers can be operable to emit an optical signal having a different peak wavelength within a specified optical wavelength range. Each EOM of the plurality of EOMs can be configured to accept an optical carrier signal from a respective one of the plurality of lasers, accept a different one of the plurality of feed element signals from the GBBF, which may be frequency up-converted and filtered prior to being accepted by the EOM, and output a respective optical feed element signal in dependence on the optical carrier signal and the feed element signal accepted by the EOM. The WDM multiplexer can be configured to accept the optical feed element signals output by the plurality of EOMs, and combine the plurality of optical feed element signals into a wavelength division multiplexed optical signal. The optical amplifier can be configured to amplify the wavelength division multiplexed optical signal to thereby produce an optically amplified wavelength division multiplexed optical signal. The transmitter optics can be configured to accept the optically amplified wavelength division multiplexed optical signal and transmit an optical feeder uplink beam to the satellite in dependence thereon.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A ground based subsystem for use in transmitting an optical feeder uplink beam to a satellite that includes a multiple element antenna feed array and that is configured to receive the optical feeder uplink beam and in dependence thereon use the multiple element antenna feed array to produce and transmit a plurality of RF service downlink beams to service terminals, the ground based subsystem comprising:

a ground based beamformer (GBBF) configured to accept a plurality of spot beam signals, produce or otherwise obtain phase and amplitude beamforming coefficients, and output a plurality of feed element signals in dependence on the plurality of spot beam signals and the phase and amplitude beamforming coefficients;

a plurality of lasers, each of the lasers operable to emit an optical signal having a different peak wavelength within a specified optical wavelength range;

a plurality of electro-optical modulators (EOMs), each EOM of the plurality of EOMs configured to accept an optical carrier signal from a respective one of the plurality of lasers, accept a different one of the plurality of feed element signals from the GBBF, and output a respective optical feed element signal in dependence on the optical carrier signal and the feed element signal accepted by the EOM;

a wavelength-division multiplexing (WDM) multiplexer configured to accept the optical feed element signals output by the plurality of EOMs, and combine the plurality of optical feed element signals into a wavelength division multiplexed optical signal;

an optical amplifier configured to amplify the wavelength division multiplexed optical signal to thereby produce an optically amplified wavelength division multiplexed optical signal; and transmitter optics configured to accept the optically amplified wavelength division multiplexed optical signal and transmit an optical feeder uplink beam to the satellite in dependence thereon.

2. The subsystem of claim 1, further comprising:
a user data to spot beam controller configured to accept a set of user data signals and combine subsets of the user data signals into the spot beam signals that are provided to the GBBF.

3. The subsystem of claim 1, wherein the GBBF is further configured to:
produce multiple copies of each of the spot beam signals accepted by the GBBF;
use the phase and amplitude coefficients to weight different copies of the spot beam signals in different manners; and
sum subsets of the weighted copies of the spot beam signals to thereby produce the feed element signals, which may be frequency up-converted and filtered prior to being accepted by the EOMs.

4. The subsystem of claim 1, further comprising:
a plurality of frequency up-converters each of which is configured to frequency-up convert one of the feed element signals output by the GBBF before the feed element signal is provided to one of the EOMs; and
a plurality of filters each of which is configured to filter one of the feed element signals after the feed element signal has been frequency up-converted, but prior to the feed element signal being provided to one of the EOMs.

5. The subsystem of claim 4, wherein the frequency up-converters are configured to cause the optical feed element signals output by the plurality of EOMs to each have an RF frequency within a same specified RF frequency range within which the satellite is configured to transmit the plurality of RF service downlink beams.

6. The subsystem of claim 1, wherein:
the optical feed element signals output by the plurality of EOMs each have an RF frequency within a same specified RF frequency range within which the satellite is configured to transmit the plurality of RF service downlink beams; and
because RF frequencies of the optical feed element signals output by the plurality of EOMs are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam.

7. The subsystem of claim 1, wherein a specified RF frequency range within which the satellite is configured to produce and transmit the plurality of RF service downlink beams comprises a downlink portion of the Ka band.

8. The subsystem of claim 7, wherein:
the downlink portion of the Ka band is from 17.7 GHz to 20.2 GHz, and thus, has a bandwidth of 2.5 GHz; or
the downlink portion of the Ka band is from 17.3 GHz to 20.2 GHz, and thus, has a bandwidth of 2.9 GHz.

9. The subsystem of claim 1, wherein an optical wavelength range of the optical feeder uplink beam is a contiguous or non-contiguous optical wavelength range within an infrared (IR) spectrum.

10. The subsystem of claim 1, wherein at least one of the feed elements signals accepted by at least one of the EOMs is frequency up-converted and filtered prior to being accepted by the at least one of the EOMs.

11. A method for enabling a ground based subsystem to produce and transmit an optical feeder uplink beam to a satellite that includes a multiple element antenna feed array and that is configured to receive the optical feeder uplink beam and in dependence thereon use the multiple element antenna feed array to produce and transmit a plurality of RF service downlink beams to service terminals, the method for use by the ground based subsystem comprising:

performing ground based beamforming by accepting a plurality of spot beam signals, producing or otherwise obtaining phase and amplitude beamforming coefficients, and producing a plurality of feed element signals in dependence on the plurality of spot beam signals and the phase and amplitude beamforming coefficients;

emitting a plurality of optical carrier signals each having a different peak wavelength that is within a specified optical wavelength range;

electro-optically modulating each of the optical carrier signals with one of feed element signals produced by the ground based beamforming to thereby produce a plurality of optical feed element signals;

multiplexing the plurality of optical feed element signals to thereby produce a wavelength division multiplexed optical signal that includes data for the plurality of RF service downlink beams;

producing an optical feeder uplink beam, in dependence on the wavelength division multiplexed optical signal; and transmitting the optical feeder uplink beam through free-space to the satellite.

12. The method of claim 11, further comprising:
accepting a set of user data signals; and
combining subsets of the user data signals into the spot beam signals that are used for the ground based beamforming.

13. The method of claim 11, wherein the ground based beamforming further comprises:
producing multiple copies of each of the spot beam signals;
using the phase and amplitude coefficients to weight different copies of the spot beam signals in different manners; and
summing subsets of the weighted copies of the spot beam signals to thereby produced the feed element signals, which may be frequency up-converted and filtered prior to the electro-optically modulating.

14. The method of claim 11, further comprising:
frequency-up converting and filtering the feed element signals produced by the ground based beamforming prior to the electro-optically modulating.

15. The method of claim 14, wherein the frequency up-converting causes the optical feed element signals resulting from the electro-optically modulating to each have an RF frequency within a same specified RF frequency range within which the satellite is configured to transmit the plurality of RF service downlink beams.

16. The method of claim 11, wherein:
the optical feed element signals resulting from the electro-optically modulating each have an RF frequency within a same specified RF frequency range within which the satellite is configured to transmit the plurality of RF service downlink beams; and
because RF frequencies of the optical feed element resulting from the electro-optically modulating are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam.

17. The method of claim 11, wherein at least one of the feed elements signals that is used in the electro-optically modulating is frequency up-converted and filtered prior to the electro-optically modulating.

18. A ground based subsystem for use in transmitting an optical feeder uplink beam to a satellite that includes a multiple element antenna feed array and that is configured to receive the optical feeder uplink beam and in dependence thereon use the multiple element antenna feed array to produce and transmit a plurality of RF service downlink beams to service terminals, the ground based subsystem comprising:
a ground based beamformer (GBBF) including a GBBF controller, a signal replication and forward beamforming weighting unit that is controlled by the GBBF controller, and a plurality of summers;
the GBBF controller configured to produce phase and amplitude beamforming coefficients in dependence on calibration information accepted from a calibration subsystem;
the signal replication and forward beamforming weighting unit configured to replicate each of a plurality of spot beam signals, weight each of the replicated spot beam signals in dependence on phase and amplitude beamforming coefficients produced by the GBBF controller, and output a set of phase and amplitude weighted signals;
the plurality of summers configured to sum respective subsets of the phase and amplitude weighted signals to thereby produce a plurality of feed element signals;
a plurality of lasers, each of the lasers operable to emit an optical signal having a different peak wavelength within a specified optical wavelength range;
a plurality of electro-optical modulators (EOMs), each EOM of the plurality of EOMs configured to accept an optical carrier signal from a respective one of the plurality of lasers, accept a different one of the plurality of feed element signals from the GBBF, and output a respective optical feed element signal in dependence on the optical carrier signal and the feed element signal accepted by the EOM;
a wavelength-division multiplexing (WDM) multiplexer configured to accept the optical feed element signals output by the plurality of EOMs, and combine the plurality of optical feed element signals into a wavelength division multiplexed optical signal;
an optical amplifier configured to amplify the wavelength division multiplexed optical signal to thereby produce an optically amplified wavelength division multiplexed optical signal; and
transmitter optics configured to accept the optically amplified wavelength division multiplexed optical signal and transmit an optical feeder uplink beam to the satellite in dependence thereon.

19. The subsystem of claim 18, further comprising:
a user data to spot beam controller configured to accept a set of user data signals and combine subsets of the user data signals into the spot beam signals that are provided to the GBBF.

20. The subsystem of claim 18, further comprising:
a plurality of frequency up-converters each of which is configured to frequency-up convert one of the feed element signals output by the GBBF before the feed element signal is provided to one of the EOMs; and
a plurality of filters each of which is configured to filter one of the feed element signals after the feed element signal has been frequency up-converted, but prior to the feed element signal being provided to one of the EOMs;
wherein the frequency up-converters are configured to cause the optical feed element signals output by the plurality of EOMs to each have an RF frequency within a same specified RF frequency range within which the satellite is configured to transmit the plurality of RF service downlink beams.

21. The subsystem of claim 18, wherein a specified RF frequency range within which the satellite is configured to produce and transmit the plurality of RF service downlink beams comprises a downlink portion of the Ka band.

22. The subsystem of claim 18, wherein an optical wavelength range of the optical feeder uplink beam is a contiguous or non-contiguous optical wavelength range within an infrared (IR) spectrum.

23. The subsystem of claim 18, wherein at least one of the feed elements signals accepted by at least one of the EOMs is frequency up-converted and filtered prior to being accepted by the at least one of the EOMs.

* * * * *